(12) United States Patent
Shirai et al.

(10) Patent No.: US 7,426,046 B2
(45) Date of Patent: Sep. 16, 2008

(54) INFORMATION PROCESSING APPARATUS, INFORMATION PROCESSING METHOD, INFORMATION PROCESSING PROGRAM, AND STORAGE MEDIUM

(75) Inventors: Kenichi Shirai, Kanagawa (JP); Noriyoshi Kurotsu, Kanagawa (JP); Masamichi Ohshima, Tokyo (JP); Hidekazu Morooka, Kanagawa (JP); Takashi Yagita, Kanagawa (JP); Koichiro Wanda, Kanagawa (JP); Koji Kikuchi, Kanagawa (JP); Kei Kitagata, Kanagawa (JP); Hiroyuki Kayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 11/001,508

(22) Filed: Dec. 1, 2004

(65) Prior Publication Data
US 2005/0141007 A1 Jun. 30, 2005

(30) Foreign Application Priority Data
Dec. 3, 2003 (JP) .............................. 2003-405028

(51) Int. Cl.
*G06F 15/00* (2006.01)
*G05B 15/00* (2006.01)
(52) U.S. Cl. .................... 358/1.13; 358/1.18; 358/1.15; 700/83

(58) Field of Classification Search ................ 358/1.13, 358/1.15, 1.9, 3.06, 3.09, 3.1, 3.13–3.18, 358/534–536, 1.1, 3.02, 3.23, 3.2, 3.29, 3.11, 358/3.12, 1.8, 2.1, 3.28, 1.11, 1.12, 1.14, 358/403, 1.16, 1.17, 1.18, 448, 296, 508, 358/401, 405, 409; 382/270, 112, 158; 340/10.6; 345/619, 581, 689, 531, 538, 205, 214; 700/3, 700/9, 15, 17, 83, 184
See application file for complete search history.

(56) References Cited
U.S. PATENT DOCUMENTS
5,706,411 A * 1/1998 McCormick et al. ....... 358/1.14
(Continued)

FOREIGN PATENT DOCUMENTS
JP 6-348793 A 12/1994
(Continued)

*Primary Examiner*—King Poon
*Assistant Examiner*—Steven Kau
(74) *Attorney, Agent, or Firm*—Canon U.S.A. Inc., I.P. Division

(57) ABSTRACT

A print job icon symbolically representing a print job and printer icons symbolically representing a plurality of printers are displayed on the screen of a display in an information processing apparatus. When a command to transfer the print job icon is issued, whether a requested print job can be transferred to any printer is easily determined. When the print job is selected, the information processing apparatus easily discriminates between a printer able to output the print job and a printer unable to output the print job.

26 Claims, 22 Drawing Sheets

U.S. PATENT DOCUMENTS

| | | | |
|---|---|---|---|
| 5,978,559 A | 11/1999 | Quinion | |
| 6,054,988 A * | 4/2000 | Alimpich et al. | 715/769 |
| 6,232,968 B1 * | 5/2001 | Alimpich et al. | 715/744 |
| 6,469,796 B1 * | 10/2002 | Leiman et al. | 358/1.15 |
| 6,940,615 B1 * | 9/2005 | Shima | 358/1.15 |
| 2002/0186408 A1 * | 12/2002 | Nakaoka et al. | 358/1.15 |

FOREIGN PATENT DOCUMENTS

| | | |
|---|---|---|
| JP | 8-185301 A | 7/1996 |
| JP | 11-175300 A | 7/1999 |
| JP | 2000-276313 A | 10/2000 |
| JP | 2001-159939 A | 6/2001 |
| JP | 2001-159940 A | 6/2001 |
| JP | 2002-149388 A | 5/2002 |
| JP | 2003-167712 A | 6/2003 |
| JP | 2003-256173 A | 9/2003 |
| JP | 2004-062412 A | 2/2004 |
| JP | 2005-031732 A | 2/2005 |

* cited by examiner

FIG. 13A

| PRINTER TYPE / JOB TYPE | LOGICAL PRINTER (PDL DRIVER) | | GROUP PRINTER (GROUP PRINTER DRIVER) |
|---|---|---|---|
| | SAME TYPE DRIVER | DIFFERENT TYPE DRIVER | |
| DIRECT PRINT JOB (PDL FILE) | ○ | × | × |
| MEMBER JOB (PDL FILE) | ○ | ○ | × |
| GROUP JOB (INTERMEDIATE FORMAT FILE) | × | × | × |

○ : TRANSFERABLE  × : NONTRANSFERABLE

FIG. 13B

| STATUS BAR MESSAGE (1301) | TOOL CHIP CHIP MESSAGE (1302) | CORRESPONDENCE TO FIGS. 11 AND 18 (1303) | CONDITIONS (1304) |
|---|---|---|---|
| NO PRINTER IS AVAILABLE TO WHICH SELECTED PRINT JOB IS TRANSFERRED | | STEP 1113 | PRINTER SELECTABLE AS DESTINATION OF PRINT JOB BEING DRAGGED IS NOT REGISTERED IN OS |
| SELECTED PRINT JOB IS NOT TRANSFERABLE TO THIS PRINTER | NOT TRANSFERABLE  | STEP 1115 (STEP 1805) | ALWAYS APPLICABLE |
| NEXT PRINT SETTING IS NEGLECTED AFTER SELECTED PRINT JOB IS TRANSFERRED <SETTING 1>, <SETTING 2>,... | PRINT SETTING OF <SETTING N> IS NEGLECTED  | STEP 1114 (STEP 1809) | PRINT SETTING OF PRINT JOB REQUIRES FUNCTION LACKS DEVICE WHICH IS ASSOCIATED WITH PRINTER WITH MOUSE CURSOR PLACED THEREON (DISPLAYED WITH ATTENTION MARK ATTACHED) |

INFORMATION PROCESSING APPARATUS, INFORMATION PROCESSING METHOD, INFORMATION PROCESSING PROGRAM, AND STORAGE MEDIUM

BACKGROUND OF THE INVENTION

1. Field of the Invention

The present invention relates to a print job process in an information processing apparatus that communicates with a printer device.

2. Description of the Related Art

Hitherto, information processing apparatuses displaying a presentation element symbolically representing a print job and a presentation element symbolically representing a printer device on a screen thereof are known. A technique for transferring a print job registered in a print queue to another print queue is also known (Japanese Patent Laid-Open No. 11-175300).

The disclosed technique cannot easily discriminate between a logical printer or a physical printer unable to output a print job and a logical printer or a physical printer able to output the print job in consideration of characteristics of the print job when the print job is selected from a list of a plurality of print jobs. When a user attempts to move a print job already produced and registered in a print queue to another print queue, the above-disclosed technique cannot discriminate between a print queue that permits a print job to be transferred and a print queue that does not permit a print job to be transferred. Particularly when a plurality of logical printers or a plurality of physical printers are registered, the transfer of the print job is difficult.

SUMMARY OF THE INVENTION

Accordingly, the present invention is conceived as a response to the above-described disadvantages of the conventional art.

According to an aspect of the present invention, an information processing apparatus communicating with an input device and a display includes a display controller that displays, on the screen of the display, at least one print job presentation element and at least one printer presentation element. The print job presentation element symbolically represents a print job and the printer presentation element symbolically represents a logical printer or a physical printer. The information processing apparatus also includes: a first acquisition unit that acquires the attribute information of the print job corresponding to the print job presentation element selected via the input device; and a second acquisition unit that acquires the attribute information of the logical printer or the physical printer corresponding to the printer presentation element. The display controller display the printer presentation elements in a recognizable manner indicating whether the logical printer or the physical printer corresponding to the printer presentation element is able to output the print job corresponding to the selected print job presentation element based on the attribute information of the print job acquired by the first acquisition unit and the attribute information of the logical printer or the physical printer acquired by the second acquisition unit.

In accordance with the present invention, a printer able to output a print job and a printer unable to output the print job are easily discriminated when the print job presentation element is selected on the screen of the display.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIGS. 13A and 13B illustrate combinations of types of print jobs and types of printers, to which the print jobs are transferable, in a print job control system in accordance with the first embodiment of the present invention.

DESCRIPTION OF THE EMBODIMENTS

The embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
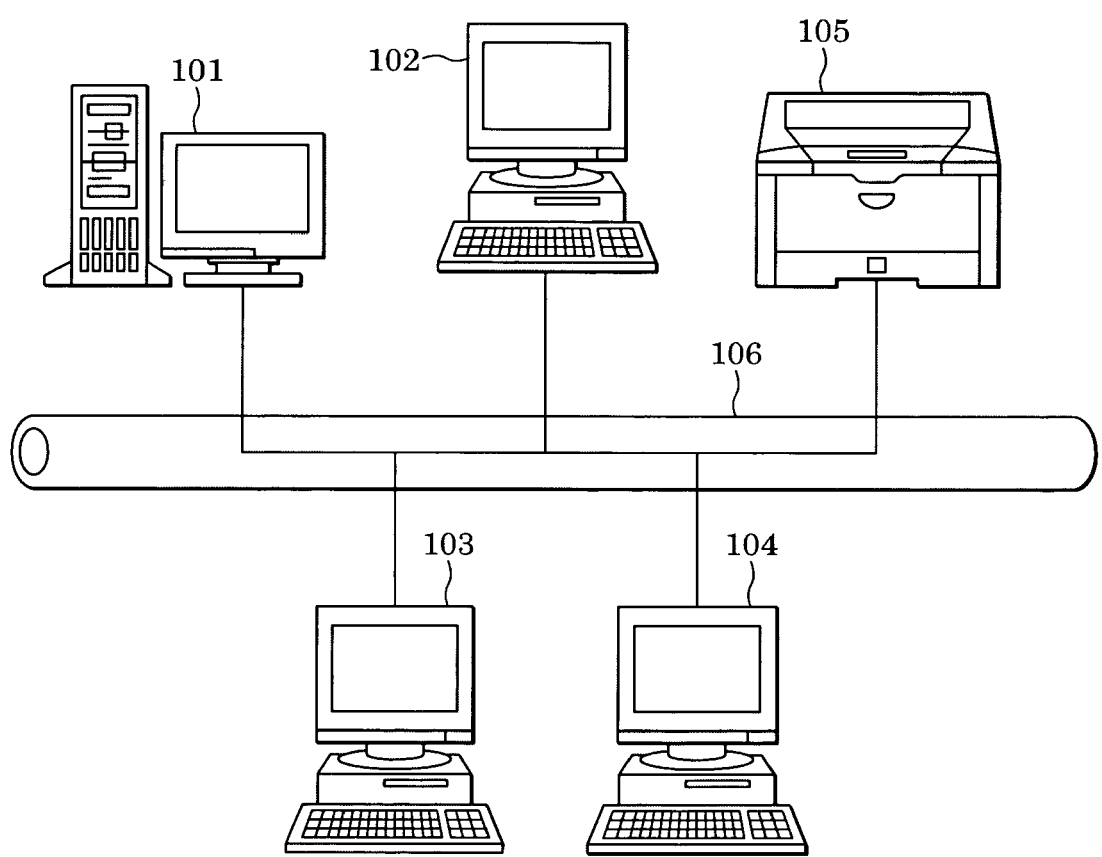
FIG. 1 is a configuration of a print processing system.

The first embodiment of the present invention is described below with reference to the drawings. A print job is dragged and dropped by using a pointing device, such as a mouse. Whether one of a logical printer and a physical printer is determined as an appropriate destination or an inappropriate destination of the print job is determined based on the attribute of the print job and the capability of a print device. A logical printer inappropriate as a destination of the print job is grayed out in presentation. FIG. 1 illustrates a configuration of a print process system in accordance with the first embodiment of the present invention.

As shown, network computers 101, 102, 103, and 104 mutually connected via a network 106 are typically personal computers (PCs). A network printer 105 is also included in the system.

Client computers (hereinafter simply referred to as clients) 102, 103, and 104 are connected to the network 106 via a network cable, such as Ethernet®, execute a variety of programs, including application programs, and includes a printer driver that converts print data into a printer language. Each client supports a plurality of printer drivers.

A server computer (hereinafter simply referred to as a server) 101, connected to the network 106, stores files used over the network 106, and monitors the operational status of the network 106. The server also functions as a print server managing a printer connected to the network 106. More specifically, when one of the client computers 102, 103, and 104 issues a print request, the print server 101 generates a print job containing print data and issues a print command to the network printer 105, manages a print order in response to print job information, containing no print data, received from the client computers 102, 103, and 104, permits the client computers 102, 103, and 104 to transmit the print job containing the print data at the turn of each of the client computers 102, 103, and 104, and acquires a variety of information of status and the print job of the network printer 105 to notify the client computers 102, 103, and 104 of the variety of information.

The network printer 105, connected to the network 106 via a network interface, analyzes the print job transmitted from the client computers 102, 103, and 104 and the server 101, converts the print job into a dot image on a per page basis, and prints the resulting data. Although a single network printer 105 is shown in FIG. 1, a plurality of other network printers are also connected to the network 106. The network printers can be different from each other in function.

Each of the client computers 102, 103, and 104, the server 101, and the network printer 105 is connected to the network 106.

Figure 2:
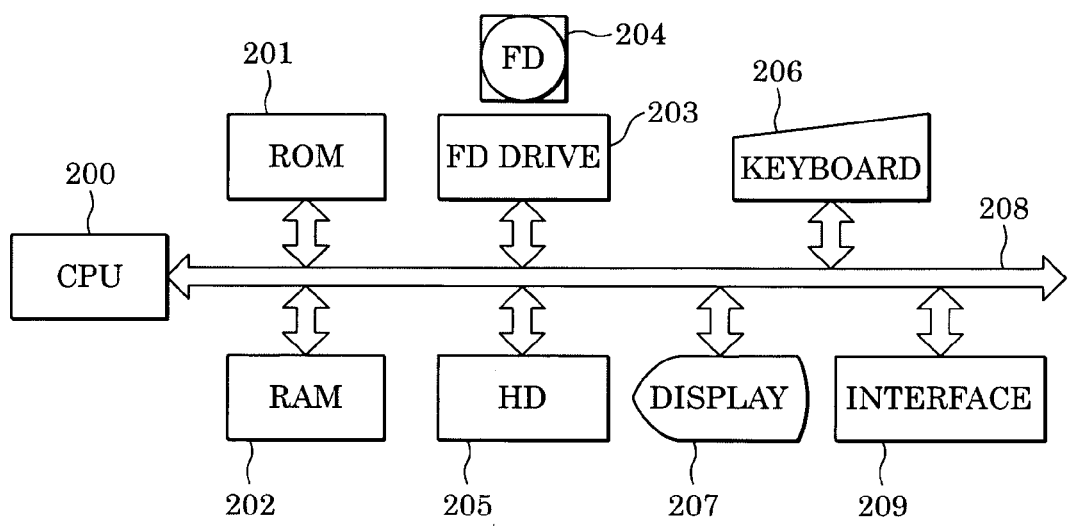
FIG. 2 is a block diagram illustrating the structure of a computer.

FIG. 2 is a block diagram illustrating a computer used as each of the client computers 102, 103, and 104, and the server 101.

In the first embodiment, the client computers 102, 103, and 104 and the server 101 are equivalent in hardware structure. Alternatively, the client computers 102, 103, and 104 and the server 101 can have their own respective hardware structures.

As shown in FIG. 2, a CPU (central processing unit) 200 generally controls the apparatus. The CPU 200 executes application programs, printer driver programs, an operating system (OS), and a print control program of the first embodiment, all stored in a hard disk (HD) 205, and stores information and files required for the execution of programs in a RAM (random-access memory) 202 temporarily. The OS is not limited to Windows®, and another OS may be used as long as the OS includes a render command. The printer driver is used for the print control program to acquire a variety of information through the OS. The printer driver may be considered as being contained in the print control program.

A read-only memory (ROM) 201 stores programs including basic I/O (input/output) programs, and a variety of data including font data, and template date for use in document processing. The random-access memory (RAM) 202, i.e., a main memory of the CPU 200, serves as a work area of the CPU 200.

A floppy disk (FD) drive 203, as a storage medium, loads a program stored in the FD 204 to the computer.

A hard disk (HD) 205, as an external memory having a large memory capacity, stores application programs, printer driver program, the OS, the print control program, and related programs. A spooler is stored in the HD 205. In the client, the spooler is a client spooler, and in a print server, the spooler is a server spooler. The print server stores print job information received from a client, and a table for performing order control in the HD 205.

A keyboard 206 is an input device. A user uses the keyboard 206 to cause a client computer to input a device control command or the like. An operator or an administrator uses the keyboard 206 to cause a print server to input a device control command or the like. A display 207 displays commands input through the keyboard 206 and the throughput of a printer, for example.

A system bus 208 transfers data in a computer as the client or the print server. An interface 209 is an input and output unit, and the information processing apparatus exchanges data with an external device via the interface 209.

The above-described structure has been discussed for exemplary purposes only, and the computer is not limited to the structure of FIG. 2. The storage destination of data and programs can be a ROM, a RAM, or an HD.

Figure 3:
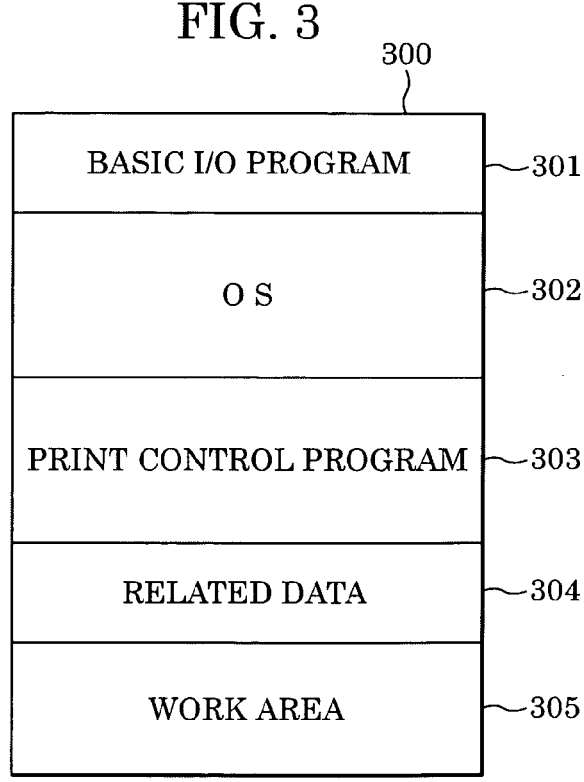
FIG. 3 illustrates a memory map of a RAM of FIG. 2.

FIG. 3 illustrates a memory map of the RAM 202 of FIG. 2. In the memory map, the print control program, loaded from the FD 204 to the RAM 202, is now ready to be executed.

In the first embodiment, the print control program and the related data are directly loaded from the FD 204 to the RAM 202. Alternatively, each time the print control program is initiated, the print control program, installed beforehand from the FD 204 to the HD 205, can be loaded to the RAM 202. A software program performing the functions equivalent to those of the devices can replace the above-described hardware devices.

In the client, the print control program includes a program to issue a command to change a print destination of a print job and a command to modify the order of print. In the print server, the print control program includes a program to control the order of print jobs and to notify of the end of print of a print job and notify of a request to change the print destination. The print control program of the first embodiment can be divided into a module to be installed in the client and a module to be installed in the print server. Alternatively, a single print control program can function as the one for the client or the one for the print server depending on a system configuration in use. Alternatively, both a module performing the function for the client and a module performing the function for the print server are installed in a single computer, and operated in pseudo-parallel fashion, concurrently or in time-division mode.

A basic I/O program 301 performs an initial program loading (IPL) function that initiates the OS when the OS is read from the HD 205 to the RAM 202 with the computer switched on. FIG. 3 also shows the OS 302, the print control program 303 and the related data 304. The print control program 303 and the related data 304 are stored in an area reserved in the RAM 202. The work area 305 is an area where the CPU 200 executes another program.

Figure 4:
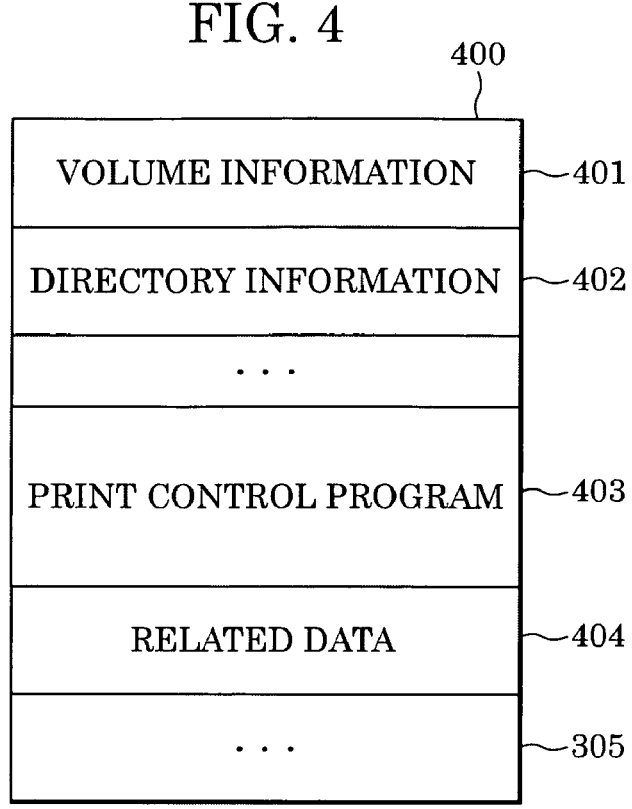
FIG. 4 illustrates a memory map of a floppy disk of FIG. 2.

FIG. 4 illustrates a memory map of the FD 204 of FIG. 2.

The memory map of FIG. 4 includes volume information 401 indicating information of data, directory information 402, a print control program 403, and related data 404. The print control program 403 is constructed based on a flowchart to be discussed later in connection with the first embodiment. In the first embodiment, the client and the server are identical in terms of the structure of the print control program 403.

Figure 5:
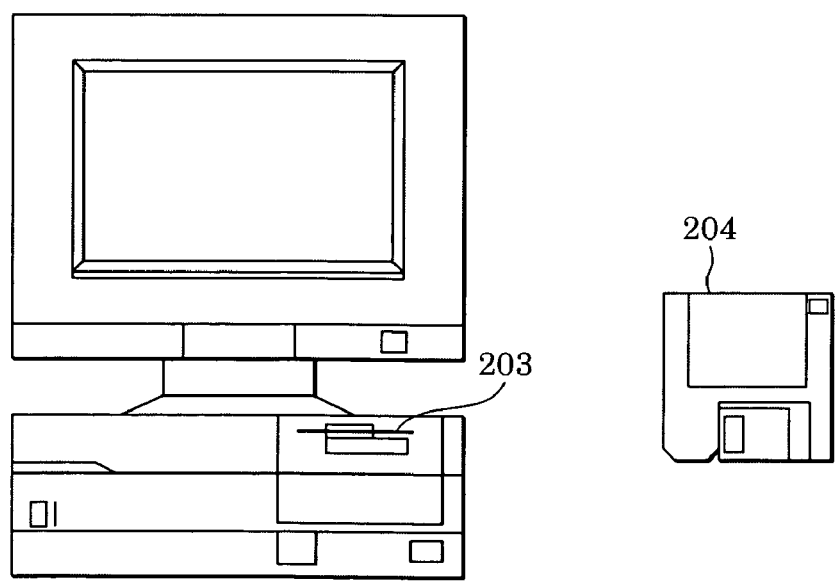
FIG. 5 illustrates a floppy disk to be loaded into a floppy disk drive of FIG. 2.

FIG. 5 illustrates the FD 204 and the FD drive 203 of FIG. 2 in which the FD 204 is loaded. Elements identical to those described with reference to FIG. 2 are designated with the same reference numerals. The FD 204 of FIG. 5 stores the print control program described later and the related data.

In the print processing system, a plurality of printers is grouped as a "group printer" that provides functions that any single printer cannot perform. When an application issues a print command to the group printer, any of the printers belonging to the group printer is allowed to print data. Each of printers grouped is referred to as "a member printer". The group printer and the member printer correspond to a group printer driver and a device driver, respectively.

Figure 8:
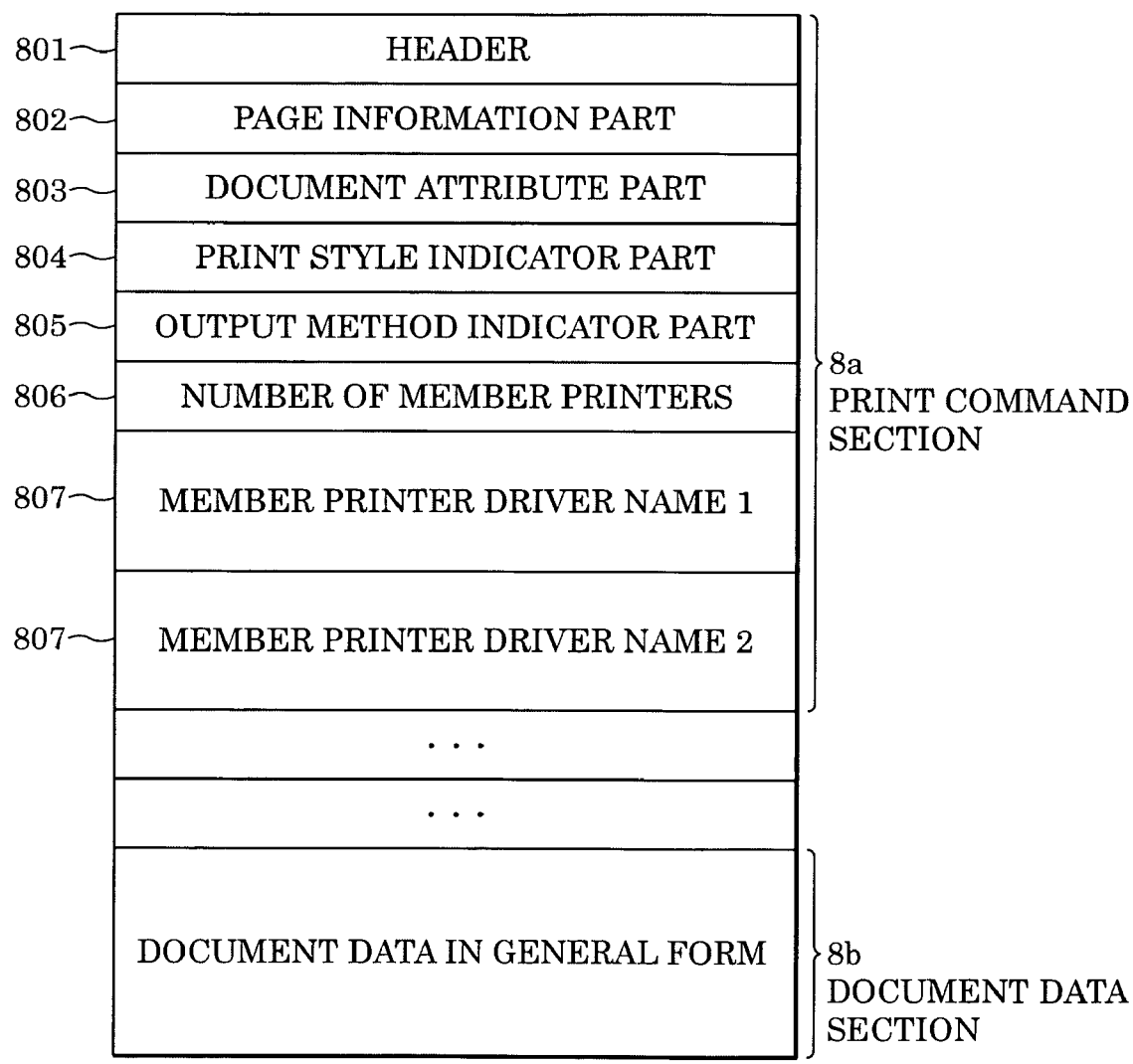
FIG. 8 illustrates the structure of a constructed intermediate file.

When an application issues a render command to the group printer using a function of the OS, the group printer driver and an intermediate file constructor 715 generates an intermediate file shown in FIG. 8. A job control print service issues a print command based on the intermediate file to each printer driver to generate a page description language based on the intermediate file. Each printer driver corresponds to the member printer.

The render command (generally referred to as a device driver interface (DDI) or a graphics device interface (GDI)) output through the OS in response to a print command from the application is interpreted to generate the page description language. The resulting data is output to a printer device through a port monitor, such as a TCP/IP (transmission control protocol/Internet protocol) standard port, supplied in the OS as standard, rather than through a job control monitor 621 of FIG. 6. The printer functioning in this way is referred to as a standard printer as opposed to the group printer and the member printer, each associated with the job control monitor 621.

Figure 7:
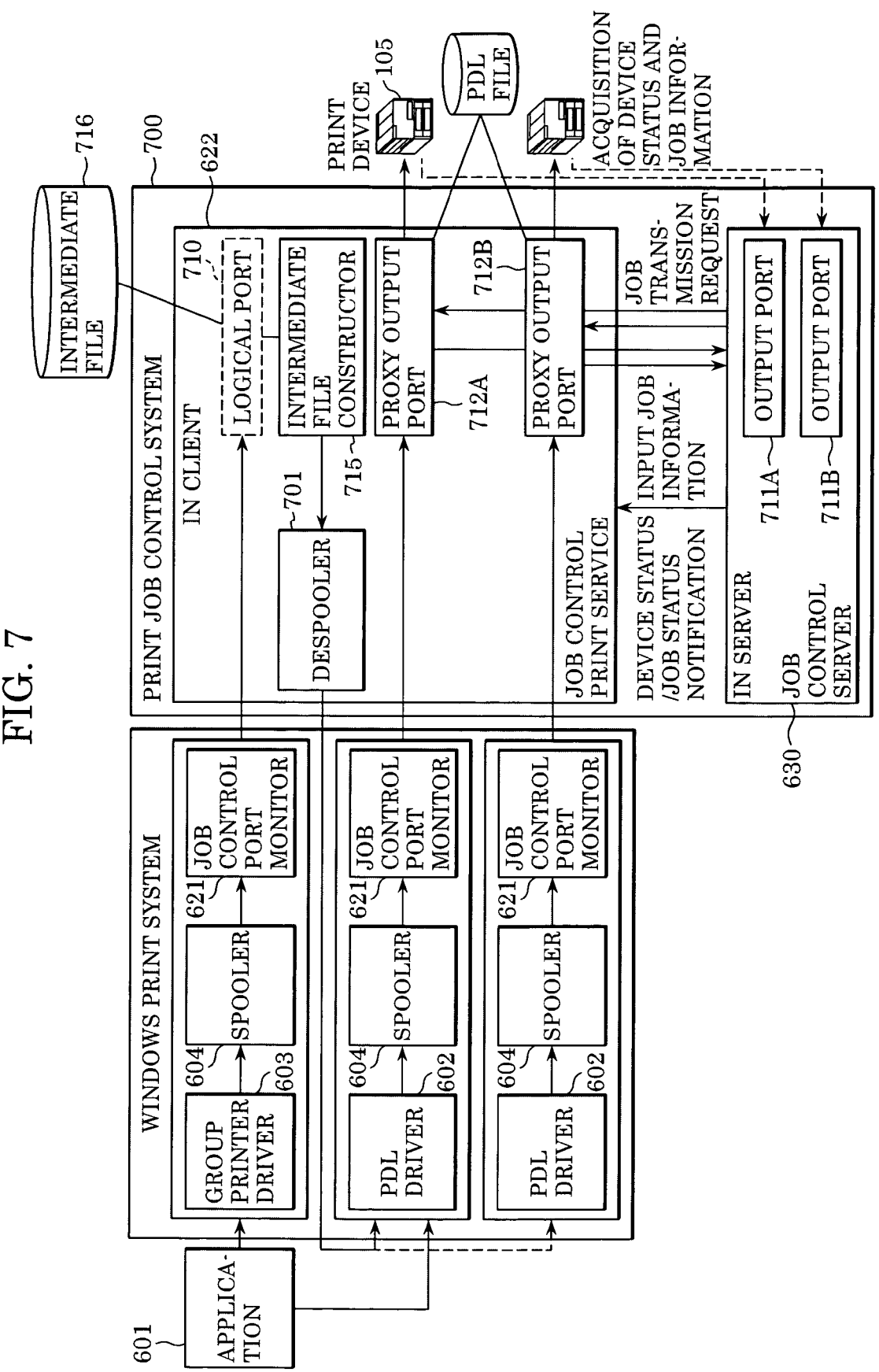
FIG. 7 illustrates print jobs processed in a print system provided by an operating system and a print job control system.

A set of a printer driver and a printer output port (see 711A, 711B, 712A, and 712B in FIG. 7), as opposed to a physical printer as a device, is referred to as a "logical printer" or simply a "printer". Designating a set of a job control port monitor and a group printer driver, shown in FIG. 7, is referred to as designating a group printer.

Figure 6:
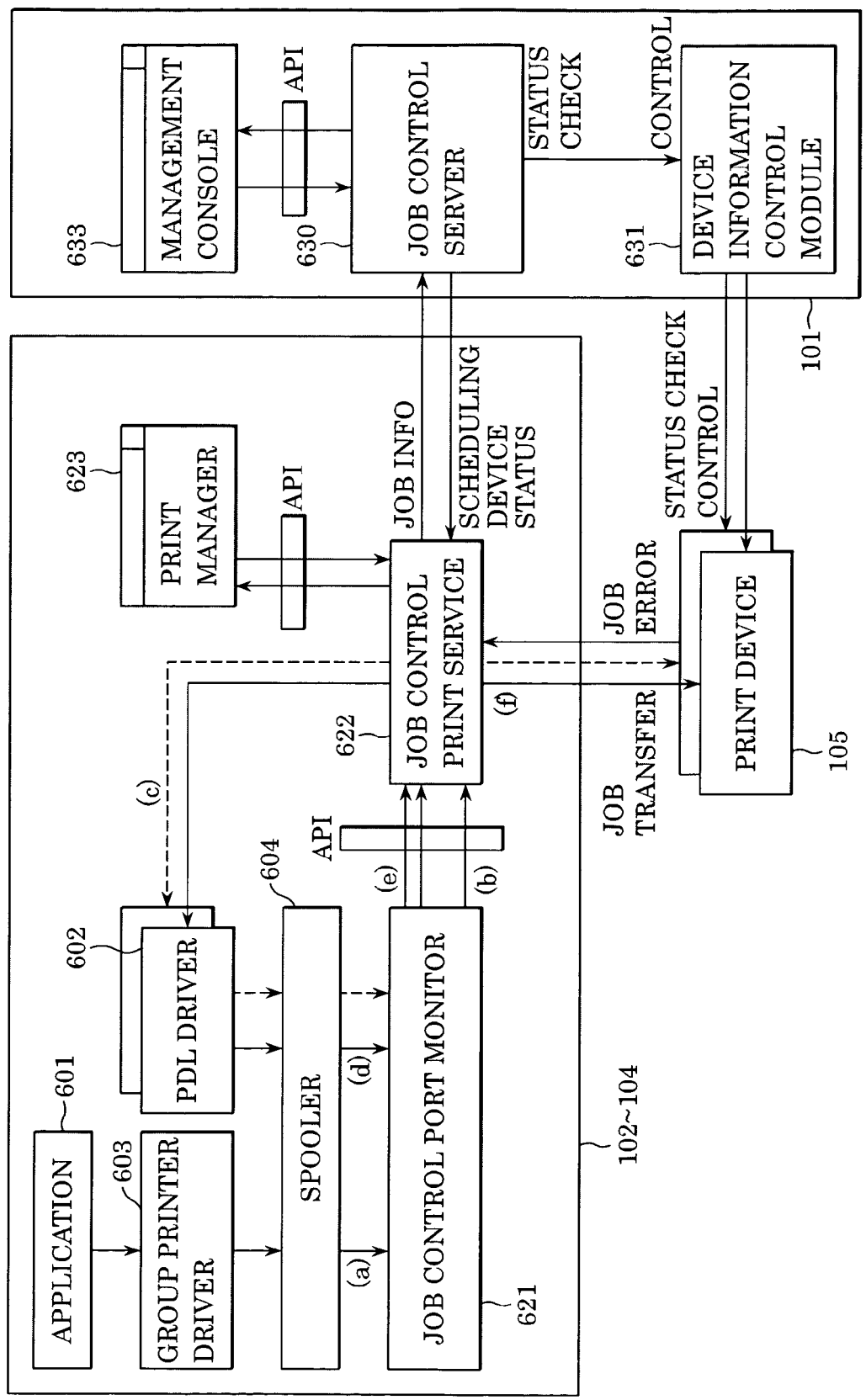
FIG. 6 illustrates a client server in a print job control system of one embodiment of the present invention, in which a print job, containing a render command, issued from a typically available application software program, such as Microsoft Word®, is processed.

FIG. 6 illustrates how a print job control system processes a print job containing a render command issued by a general application, such as Microsoft Word®, in a client server model of the system.

When a print command is issued, an application program 601 generates a series of render commands through the OS.

The generated render command is transferred to any designated program, a group printer driver 603 or a PDL driver 602. A band description language (BDL) or a printer driver generating a compression bitmap may be used instead of the PDL driver 602.

If the render command generated through the OS is supplied to the group printer driver 603, the group printer driver 603 generates an intermediate file, and transfers the intermediate file to a spooler (Windows® spooler) 604. The spooler 604 transfers a print job to a port monitor that a user selects and designates through a user interface. In the first embodiment, the port monitor is not a known port monitor that transmits a print job to a print device, but a job control port monitor 621 for print job control system designated by the user beforehand.

Print setting information, such as sheet size, and stapling instructions, set through a printer driver interface is also transferred to the job control port monitor 621.

The job control port monitor 621 transfers data in the intermediate file to a job control print service 622 for the print job control system, rather than to the print device 105.

If the render command generated by the OS is input to the PDL driver 602, the PDL driver 602 generates a page description language. The generated page description language is transmitted to a corresponding device via the job control port monitor 621 and the job control print service 622, corresponding to the PDL driver 602 set to perform a printing process.

A print manager 623 as a program provides a user interface for the print job control system. Using the print manager 623, the user examines the status of the print job in the job control print service 622 and operates the print job. The print manager 623 exchanges information and commands with the job control print service 622 through an application program interface (API) of the job control print service 622. For example, the print manager 623 issues an event designating a device to the job control print service 622. The job control print service 622 monitors the status of the device based on the event issued by the print manager 623, and notifies the print manager 623 of the result of monitoring the status of the device. A job control server 630 for the print control system schedules the timing at which the job control print service 622 of each of the clients 102, 103, and 104 transmits the print job to the print device 105. A management console 633 for the print job control system monitors the entire print job control system by exchanging information and commands with the job control server 630 via the API. The function of the job control server may be contained in each client. In such a case, the job control server may be contained in the job control print service 622.

The job control server 630 communicates with the print device 105 using a device information control module 631, in order to acquire the print job issued to each print device 105 and information relating to the operational status of the print device 105, and operate the print device 105. The acquired information is transferred to the job control print service 622 in each of the clients 102, 103, and 104.

The printing operation of the group printer driver 603 of the first embodiment is described below.

The group printer driver 603 converts a series of render commands generated by the application program 601 into intermediate data independent of the type of the OS. The intermediate data as an intermediate file is supplied to the job control print service 622 (as represented by an arrow mark (b) in FIG. 6) through the job control port monitor 621 (as represented by an arrow mark (a) in FIG. 6).

The job control print service 622 generates a render command based on the intermediate file in accordance with the type of job control for the print job, and supplies the PDL driver 602 with the render command (as represented by an arrow mark (c) in FIG. 6). The PDL driver 602 converts the render command into a PDL file interpretable by the print device 105.

FIG. 6 illustrates a proxy printing operation performed when the job control print service 622 detects an error in the print device 105 in response to the print job. A solid line represents an originally planned print job, while a broken line represents a print job generated for the proxy printing (see an arrow mark (c) of FIG. 6).

The PDL file generated by the PDL driver 602 is supplied to the job control print service 622 (as represented by an arrow mark (e) of FIG. 6) via the spooler 604 and the job control port monitor 621 (as represented by an arrow mark (d) of FIG. 6). The job control print service 622 transmits the PDL print job to the print device 105 (as represented by an arrow mark (f) of FIG. 6) in response to the command from the job control server 630.

The job control print service 622 logically partitions a single intermediate file into a plurality of print jobs and transmits the print jobs to different print devices, and transmits, to one print device, a print job that has already transmitted to another print device, in response to a command in a print order indicator in the intermediate file. Arrows marked (c), (d), (e), and (f) shown in FIG. 6 represent the flow of print job data in such a case.

FIG. 8 illustrates the structure of a constructed intermediate file.

The intermediate file used in the first embodiment includes a print command section 8*a* (corresponding to the print order indicator) and a document data section 8*b*. Information relating to a document and a print command are provided in the print command section 8*a*. The document data section 8*b* holds widely available format data into which data of a document of the application is converted. The document data section 8*b* thus holds intermediate data that is independent of or less dependent on printer languages and the type of the OS.

The intermediate data must have a format usable as print resource data and editable by word processor applications. For example, widely used as de-facto standards are Extensible Markup Language (XML), Enhanced Windows Meta-File (EMF) in a Windows® system, portable document format (PDF) supplied by Adobe Systems® Inc. and scalable vector graphics (SVG).

Settings of DEVMODE corresponding to each member printer, although not shown, are contained in the intermediate file. The settings of DEVMODE include common setting items and expanded setting items.

More specifically, the print command section 8*a* includes a header 801, a page information part 802, a document attribute part 803, a print style indicator part 804, an output method indicator part 805, a number of member printers part 806, and member printer driver name parts 807.

The header 801 stores information, such as a version identification of the file and file information. The page information part 802 stores information, such as the number of pages of the document data in the document data section 8*b*, the size of each page, etc.

The print style indicator part 804 stores information relating to print output styles, such as UI of the group printer driver, range of print pages set through the UI of each member printer, the number of prints, collation information of the document data (such as N-UP printing and binding), stapling and punching instructions. The stapling and punching instructions may be set by page (subset stapling). The content of the setting entered through the UI of the individual member printers is stored to be set in both the print style indicator part 804 and the DEVMODE of each member printer.

The output method indicator part 805 stores information relating to an output method, such as distributed printing, broadcast printing, proxy printing, standard printing (printing not in a proxy mode), etc. If the proxy printing is set in the output method indicator part 805, printer information with priority order information (with a first candidate, a second candidate . . . ) attached thereto is further contained.

The number of member printers part 806 stores the number of printers associated with the group printer. The member printer driver name parts 807 has storage areas of the number equal to the number of member printers in the number of member printers part 806.

The job control print service 622 previously discussed with reference to FIG. 6 stores the setting on the graphical user interface (GUI) of the group printer driver to the print command section 8*a* when an intermediate file is generated from the intermediate data. Furthermore, the job control print service 622 stores the intermediate data received from the group printer driver onto the document data section 8*b* as an intermediate file.

The flow of the print job is described in more detail with reference to FIG. 7. Functions identical to those described with reference to FIG. 6 are designated with the same reference numerals, and the discussion thereof is omitted here.

As shown in FIG. 7, the operation of a print job control system 700 physically straddles the server 101 and each of the clients 102, 103, and 104, with a control program running thereon. Output ports 711A and 711B managed by the printer server are respectively associated with proxy output ports 712A and 712B in the job control print service 622, in order to generally manage all proxy output ports of the clients associated with a single port. In the first embodiment, the actual print job is held by the proxy output port 712 containing a print queue of each client.

The job control server 630 issues a command to transmit the print job to the job control print service 622 rather than performing a transmission process of print data. In response to the command, the job control print service 622 of the client transmits the print data to the print device 105.

The process of the print job control system 700 for performing sophisticated printing, such as proxy printing, is described below.

When the application program 601 issues a print command to the group printer corresponding to the group printer driver 603, the job control print service 622 receives, through the job control port monitor 621, the intermediate data generated by the group printer driver 603. An intermediate file constructor 715 in the job control print service 622 constructs an intermediate file from the intermediate data as shown in FIG. 7. The job control print service 622 issues a print command to a despooler 701 in response to the print command discussed with reference to the print command section 8*a*. Through the despooler 701, the print command is issued to another print device that is assigned a PDL driver. In this way, the PDL driver generates a print job based on a PDL file. This job is referred to as a member job. The member job is generated by the group printer driver corresponding to the output method, such as the distributed printing, the broadcast printing, or the proxy printing, based on the intermediate data. A job containing a plurality of member jobs is also referred to as a member job.

In response to a command based on the interpretation of the print command section 8a of the job control print service 622, the despooler 701 organizes the document data of the document data section 8b, generating GDI. The despooler 701 issues a print command and a print job to the PDL driver 602. If a print command of 2-UP is recorded on the print style indicator part 804, the despooler 701 issues a command to the member printer through DEVMODE so that document data of 2 pages per sheet is laid out in a reduced size. A staple instruction is written on the print style indicator part 804, the despooler 701 issues a stapling command through DEVMODE. During proxy printing, the despooler 701 issues a job to a proxy target member printer written in the print command section 8a. When a reduction layout process, such as 2-UP, is performed, the despooler 701 can perform a reduction layout process based on the content of the print style indicator part 804, and then commands the member printer to print in 1-UP fashion through DEVMODE.

To issue a job to the member printer, the despooler 701 produces DEVMODE of the member printer as a print command corresponding to the member printer driver. The DEVMODE is produced by accounting for the content of the print command section 8a or the content of DEVMODE stored for each member printer in DEVMODE of each member printer.

The job control print service 622 in the client receives, through the job control port monitor 621, the print data of each member job rendered by the PDL driver 602. The job control print service 622 notifies the print server of print job information relating to the received print job. Data of the print job is temporarily stored in the proxy output port 712. Upon receiving a transmit command from the job control server 630, the job control print service 622 transmits the print job data to the print device 105.

The print job data temporarily stored in the proxy output port 712 includes, at least, the print data and the management information of the print data. As listed in Table I below, the management information includes (A) pointer of a storage location of the print data, (B) job ID (file name), (C) member job flag for identifying a member job produced from an intermediate file, (D) printer name, (E) printer drive name (printer language information) for identifying the driver in terms of type and version of printer language, (F) port name (proxy output port identifier), (G) IP address (print device identification information) to identify the printer device, (H) date and time of issue of job, (I) user name, (J) file name of PDL data, (K) host computer name, (L) print setting including both side printing and stapling, etc. Each of information items (A)-(L) may be directly included in the management information (method (1)) or may be indirectly acquired using the printer name as a parameter (method (2)). In each step of the flowcharts to be discussed later, one of the methods (1) and (2) is used to acquire each of the information.

TABLE I

Management Information

| (A) | Pointer of a storage location of the print data |
| (B) | Job ID (file name) |
| (C) | Member job flag |
| (D) | Printer name |
| (E) | Printer driver name (printer language information) |
| (F) | Port name (proxy output port identifier) |
| (G) | IP address (print device identification information) |
| (H) | Date and time of issue of job |

TABLE I-continued

Management Information

| (I) | User name |
| (J) | File name of PDL data |
| (K) | Host computer name |
| (L) | Print setting (both side printing, stapling, etc.) |

FIG. 13 illustrates the relationship between the type of the print job and the type of printer to which the print job is transferable. The "logical printer" is also simply referred to as the "printer". If the logical printer and the printer device (also referred to the physical printer) are related on a one-to-one correspondence basis, there is no particular need for discriminating between the logical printer and the physical printer.

The print job (direct print job) supplied to the printer having the PDL driver 602 from the application program 601 as shown in FIG. 7 can be transferred to a printer having the same type of driver. The print job control system 700 transfers the direct print job by shifting the PDL file as a body of the print job between the proxy output ports. This is because there is no guarantee that a PDL file produced by one type of PDL driver is correctly printed on a different type of device.

If the print job is a member job, a PDL driver 602 corresponding to the destination device converts the print data based on an intermediate file 716 serving as a source of the PDL file as a body of the print job, thus re-producing a member job. The print job control system 700 pays attention to only whether or not the destination of the print job is in a print queue of the member printer, and is free from limitation of the type of the device (type of the driver).

Two methods are available for moving the member job. In a first method, a destination printer and a source printer correspond to the printer devices of the same type. In a second method, a destination printer and a source printer correspond to printer devices of different types. In the second method, transfer is permitted across printers associated with output ports 711 and proxy output ports 712 corresponding to different types of printer devices. The PDL driver 602 assigned to the destination printer re-organizes PDL data and the management information thereof from the intermediate file 716 of FIG. 6, and registers the PDL data and the management information thereof in the print queue. When the member job is transferred to the same type of printer, any of the two methods is acceptable in the following discussion.

In any of the two transfer methods for transferring the PDL file as a body of the print job, transfer to a print queue of the group printer having the group printer driver 603 cannot be performed. The group job generated for the group printer cannot be transferred to any other print queue.

As shown in FIGS. 13A and 13B, the print job is transferable as long as the destination printer has the same optional settings such as stapling. For example, if the printers are different in optional settings even with the same type of drivers thereof, there is no guarantee that the same result of printing is obtained. In such a case, an attention mark is displayed in a distinctive manner.

Figure 14:
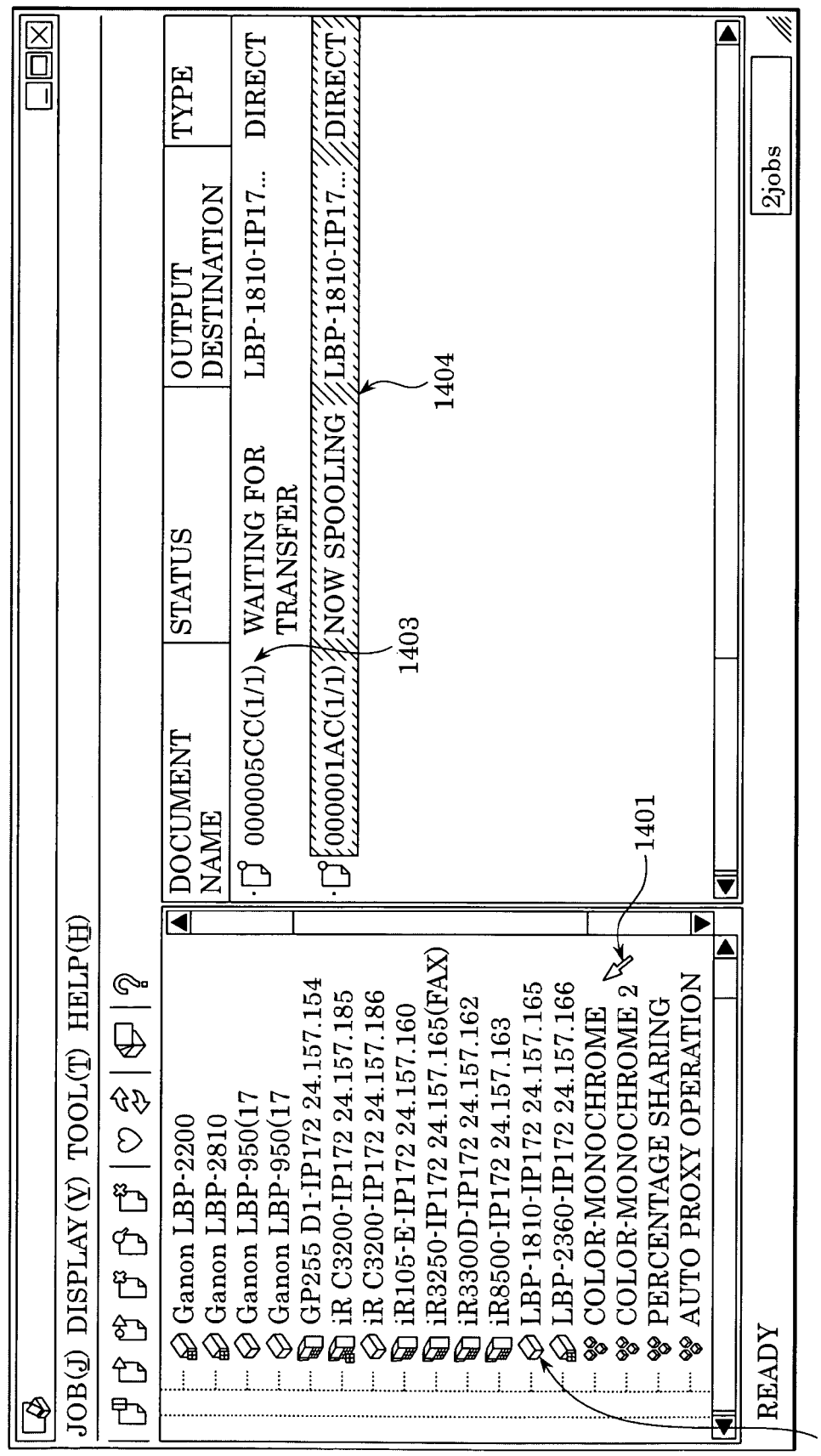
FIG. 14 illustrates an example of a screen for managing the print job.

FIG. 14 illustrates an example of a screen for managing the print job. A list of printer icons as print job presentation elements symbolically representing the print jobs is displayed on the screen of FIG. 14. A list of print job icons as printer presentation elements symbolically representing the print queue of a plurality of print devices is displayed on the screen. For example, on the screen of FIG. 14, the user learns the timing of occurrence of a trouble, if occurred, in a printer, or a busy status of a printer on "status" on a display screen, and issues a command to transfer a predetermined job to a predetermined printer at any desired timing. The same is true of the screens of FIGS. 15 and 16, and 19-24. Furthermore, a printer change command in the print job is issued not only at proxy printing when paper is jammed or an expendable item is fully consumed but also at any timing desired by the user.

FIG. 14 shows a mouse cursor 1401, a printer icon 1402, and a print job icon 1403 in normal display and a print job icon 1404 in selected status. A display of the job list and the printer list is provided by the print manager 623 discussed with reference to FIG. 6.

The printer icons listed in the printer list represent a "print queue", and contain an icon corresponding to each printer and an icon corresponding to a group printer. In the following discussion, transfer of a print job produced for a printer A to an icon of a printer B on the GUI is worded as "transfer of the print job from the printer A to the printer B". This means that a print job registered in a print queue corresponding to the printer A is deleted, and that the print job having the same content is registered in a print queue of the printer B.

In one method, the meaning of the "transfer of the print job" in the context of the present invention is that the management information, out of the PDL data and the management information representing the attribute data of the print job, contained in the print job, is updated and then associated with a different print queue for re-registration, and that a new print job thus produced is put under the management of another output port 711 and another proxy output port 712. When the direct transfer of the print job is performed, items (D), (F), and (G) of the management information in Table I are updated. When a member job is transferred, items (A), (B), (D), (E), (F), (G), (H), and (J) of the management information in Table I are updated. In this case, the print queues are not necessarily discriminated from each other physically. It is sufficient that the print queues are discriminated from each other based on the management information representing the attribute of the print job.

In an alternative method, the PDL data and an area holding the body of the management information thereof are discriminated by every output port 711 and every proxy output port 712. In this case, the transfer of the print job means switching from one output port 711 and proxy output port 712 to another output port 711 and proxy output port 712.

In any method, the print queue is contained in the output port 711 and the proxy output port 712. The transfer of the print job is understood as a transfer from output ports (711 and 712) to other output ports (711 and 712). The output port 711 and the proxy output port 712 correspond to the logical printer and the physical printer, respectively. The print queue is thus understood as one of the logical printer and the physical printer. The transfer of the print job is understood as a transfer from one of a logical printer and a physical printer to one of a different logical printer and physical printer.

In the following discussion, the method of transfer of the print job can be any of the two methods.

Figure 9:
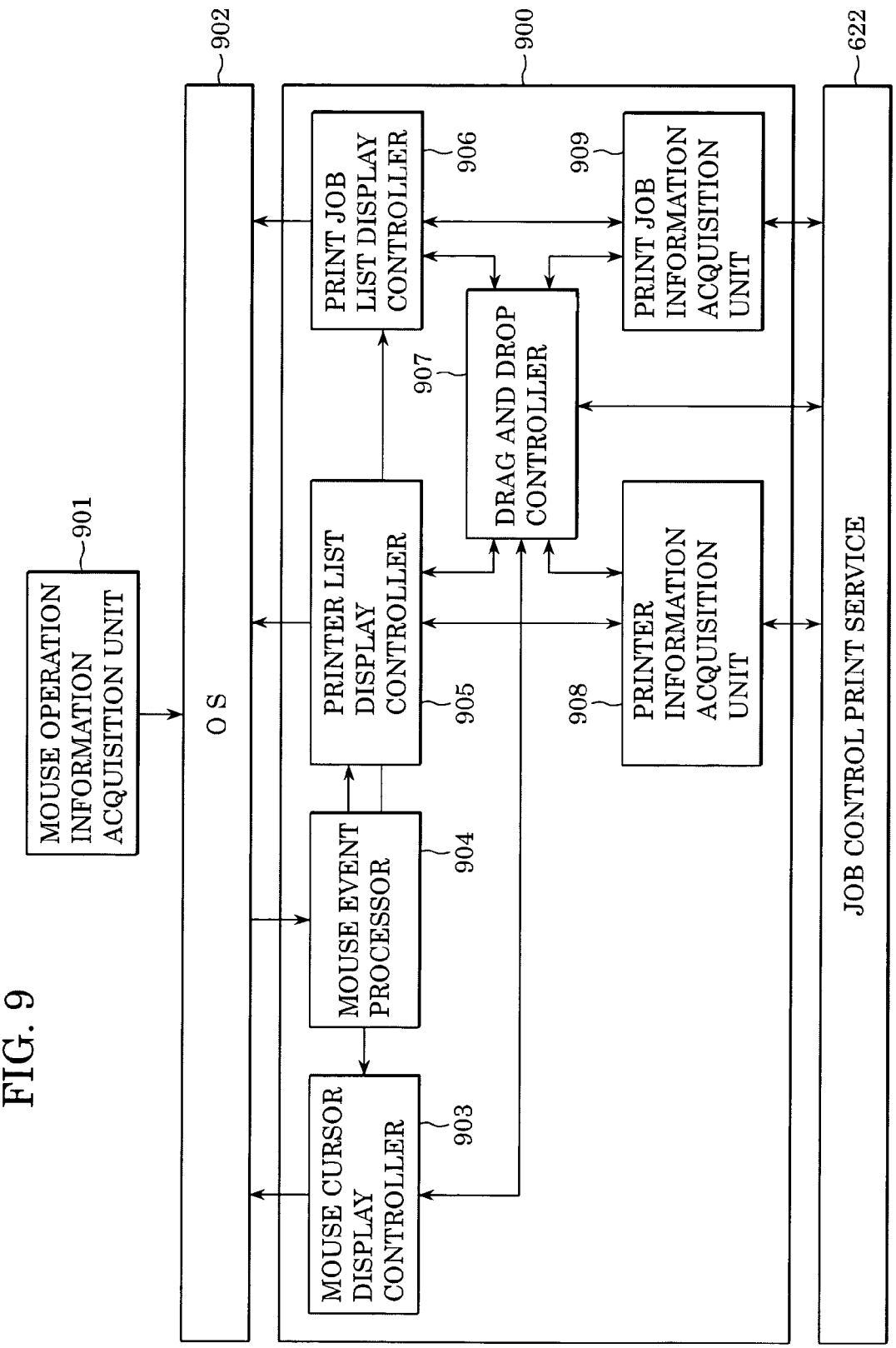
FIG. 9 is a block diagram illustrating the module structure of a print job control system.

FIG. 9 illustrates the structure of a display control module that acquires a user operational input on the screen of FIG. 14 to set the screen in response to the user operational input.

A mouse operation information acquisition unit 901 transfers operation information, such as the movement of a mouse by a user, the clicking of a button of the mouse, etc. (hereinafter collectively referred to as mouse event information) to an OS 902. The mouse operation information acquisition unit 901 is typically controlled by the OS 902, but may have the OS thereof. A mouse event processor 904 in a print manager 900 receives the mouse event information (including position coordinates of a mouse, and a handle of a window with the mouse placed on, etc.) from the OS 902. The mouse event processor 904 transfers the mouse event information to each of a mouse cursor display controller 903, a printer list display controller 905, and a print job list display controller 906. In response to the mouse event information, the mouse cursor display controller 903 commands the OS 902 to update the position and shape of a mouse cursor displayed on the screen.

The printer list display controller 905 and the print job list display controller 906 command the OS 902 to update the list of the printers and the list of the print jobs on the screen in response to the mouse event information.

A drag and drop controller 907 acquires the position data of the mouse cursor from the mouse cursor display controller 903, and information relating to the print device from the job control print service 622 through the printer information acquisition unit 908. The drag and drop controller 907 then determines the state of the printer icon the drag and drop controller 907 has to display, and notifies the printer list display controller 905 of the state information.

The printer list display controller 905 displays the printer icon on the printer list based on the information relating to the print device acquired from the job control print service 622 through the printer information acquisition unit 908 and information supplied from the drag and drop controller 907.

The drag and drop controller 907 acquires the position information of the mouse cursor from the mouse cursor display controller 903, and information relating to the print job from the job control print service 622 through the printer information acquisition unit 908. The drag and drop controller 907 then determines the state of the print job the printer list display controller 905 has to display, and notifies the print job list display controller 906 of the state information.

The print job list display controller 906 displays an icon of each print job in the print job list based on the information relating to the print job acquired from the job control print service 622 through the printer information acquisition unit 908 and information transferred from the drag and drop controller 907.

Steps in flowcharts shown in FIGS. 10, 11, 12, 17, and 18 are described below with reference to respective blocks in FIG. 9. The function sharing among the blocks in FIG. 9 are shown for exemplary purposes only. For example, the function of one block can be performed in part or in whole by another block. No particular limit is set to function sharing.

Figure 10:
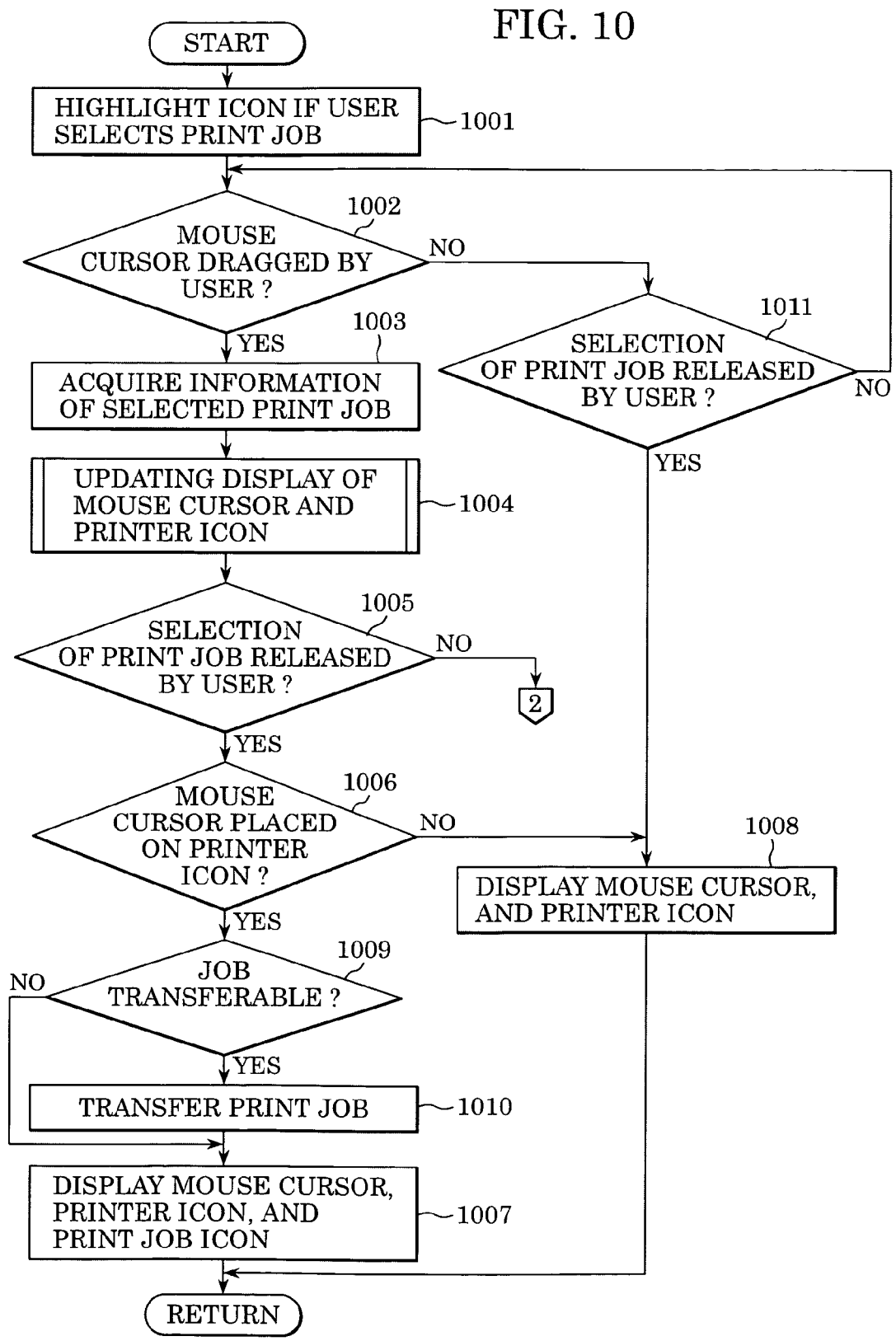
FIG. 10 is a flowchart illustrating the entire process of the transfer of a print job in a drag and drop operation in accordance with a first embodiment of the present invention.

A display process in the print job transfer operation is described below with reference to FIG. 10. FIG. 10 is a flowchart illustrating a process of a transfer command of a selected print job.

When the user selects one print job from a print lob list in a point and click operation, an icon of the print job is highlighted in response in step 1001. The operation that the user is going to perform on the selected print job cannot be determined at this point of time. In other words, the user may drag the mouse to transfer the print job, or may perform another operation, such as stopping or deleting an item on a menu by releasing a mouse button. At this point in time, the icon of the print is merely highlighted. A plurality of print jobs can be selected. The same is true of step 1701 of FIG. 17.

The mouse operation information acquisition unit 901 detects the operation input of the user, and transfers the operation input to the print job list display controller 906 through the OS 902 and the mouse event processor 904. The print job list display controller 906 determines the selected print job from the location of the mouse clicking, and highlights the print job.

It is determined in step 1002 whether a command to transfer the selected print job (starting dragging the selected print job) is issued. In other words, it is determined whether the user has performed a drag operation. More specifically, if the user drags the print job highlighted in step 1001, the mouse operation information acquisition unit 901 detects the drag operation. It is determined whether the mouse event processor 904 has received mouse operation information of the user detected by the mouse operation information acquisition unit 901 as a drag event or a drag-over event.

If it is determined that a drag operation was performed (yes in step 1002), the attribute of the dragged print job is acquired in step 1003. In response to the determination that a drag operation was performed (yes in step 1002), the print job list display controller 906 causes the print job information acquisition unit 909 to acquire detailed information (attribute) of the print job selected in step 1001. The acquired information is held in a clipboard. A drag start event represents the starting of movement of the mouse with the button thereof remaining pressed by the user.

The information acquired in step 1003 includes the management information from items (A) through (L) listed in Table I. In another embodiment, key information, such as item (A) of job ID may be acquired in step 1003. In the process in steps 1105 and 1108 to be discussed later, required information from among items (B)-(L) is acquired in accordance with the key information.

The events refer to a variety of external events occurring in response to external factors, such as keyboard inputs and mouse inputs entered by the user. Since the events are not based on the context of application software programs, the application software programs must analyze event information to interpret the meaning of each event. In the case of a drag start event, for example, the OS 902 provides a mechanism for determining the job icon related to the drag start event. The determination of the print job corresponding to the drag start event is left to the responsibility of an application, namely, the print manager 900.

Figure 16:
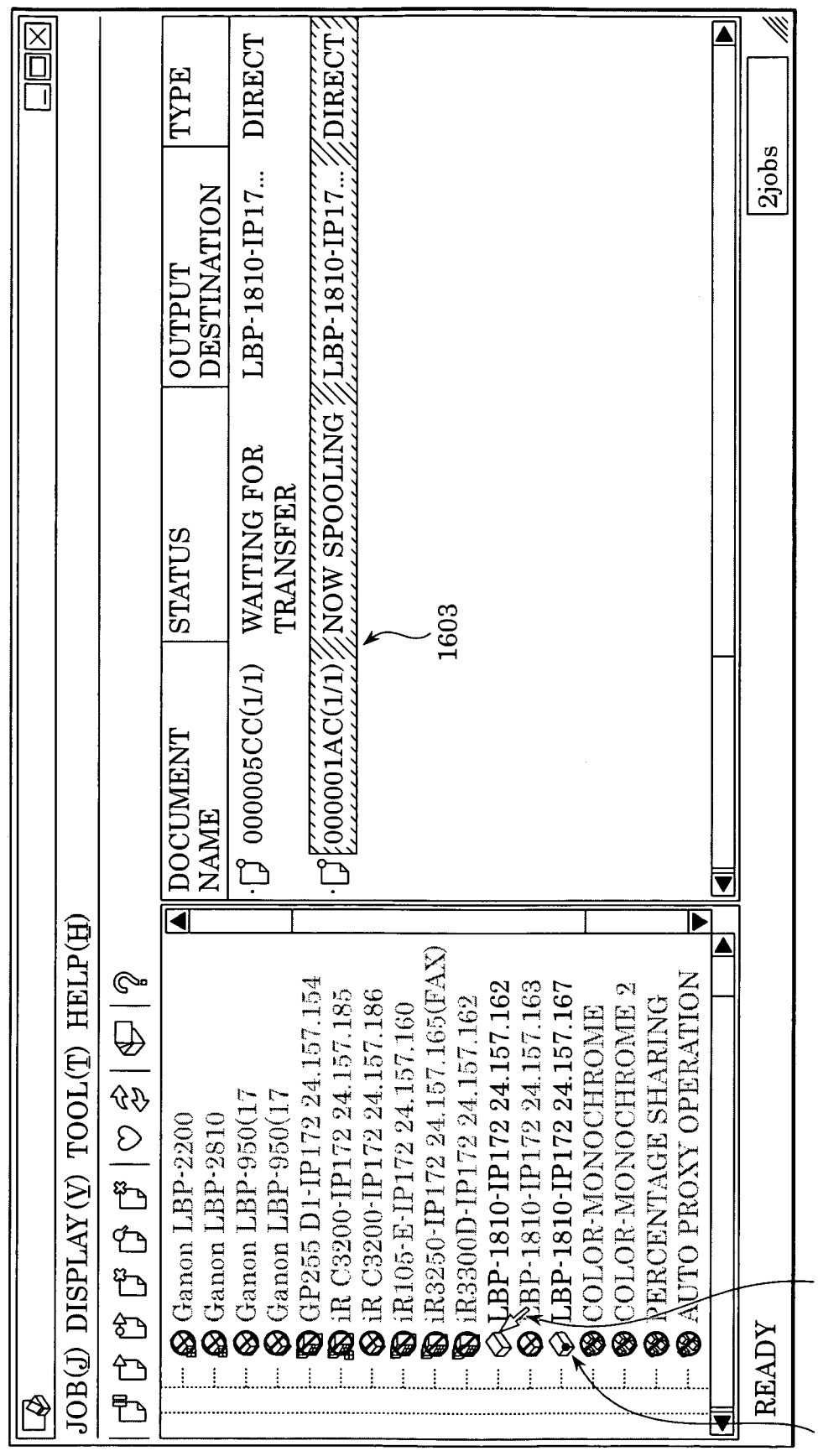
FIG. 16 illustrates a display of a printer icon with an attention mark attached thereto in accordance with the first embodiment of the present invention.
Figure 17:
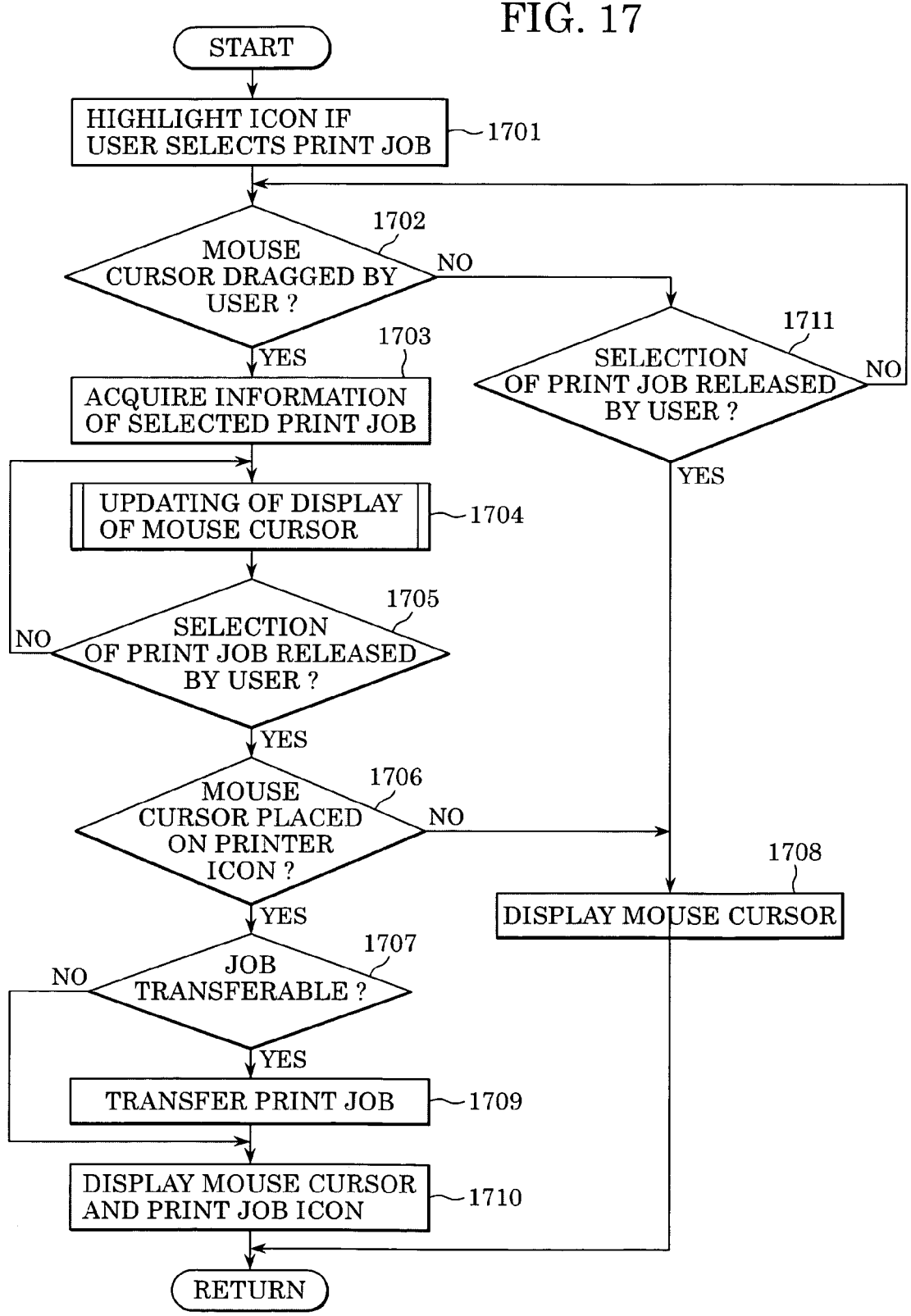
FIG. 17 is a flowchart illustrating the entire process of a print job transfer in a drag and drop operation in accordance with a second embodiment of the present invention.
Figure 18:
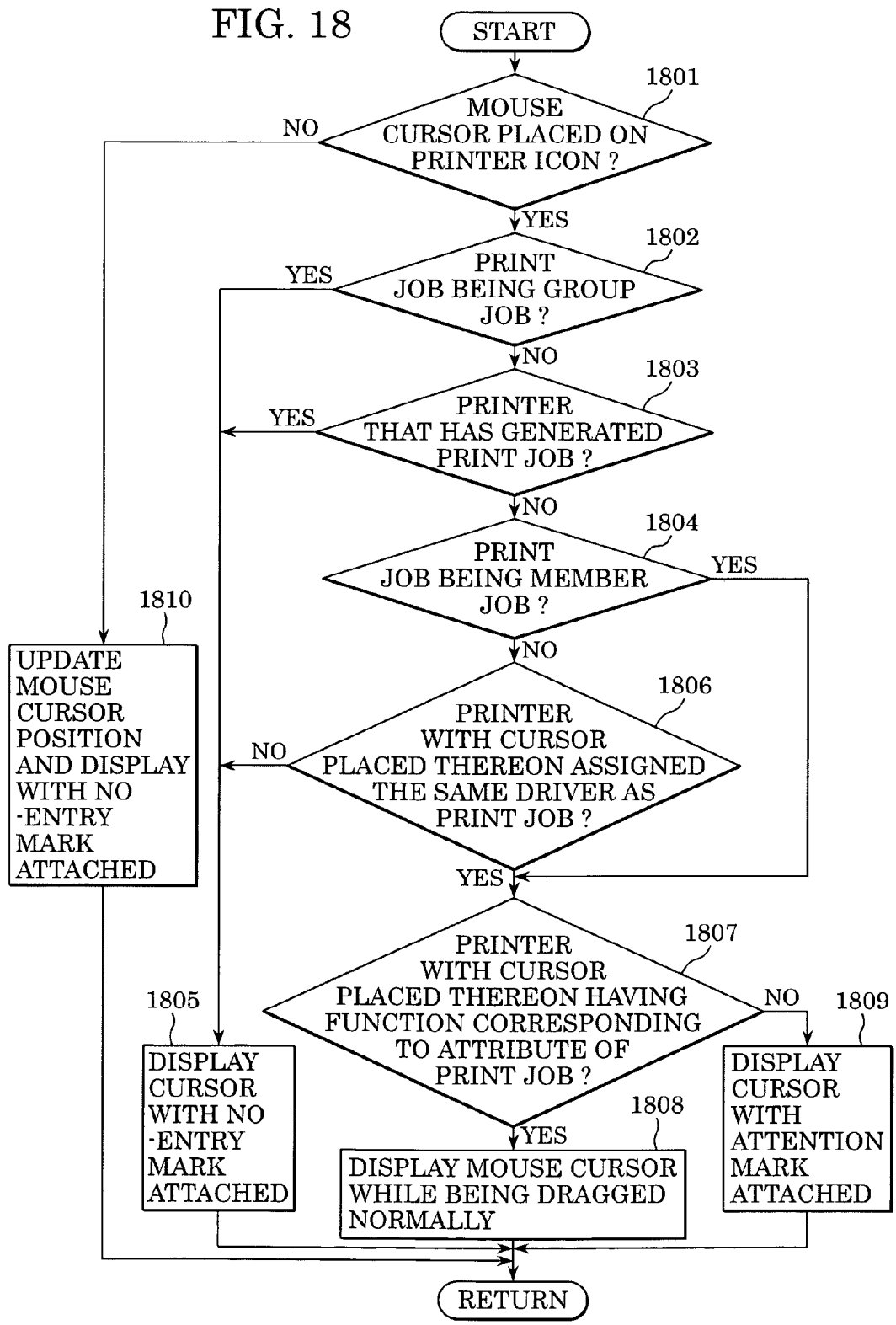
FIG. 18 is a flowchart illustrating in detail a display process of a mouse cursor in accordance with the second embodiment of the present invention.

If it is determined that the user has performed a drag operation (yes in step 1002), the mouse cursor and the printer icon on the printer list are updated in presentation (step 1004). FIGS. 16 through 18 illustrate the icons on the left-hand side portion thereof. The icon can be a logical printer or a physical printer. The shape of the mouse cursor is changed at this timing. This is because the user starts the drag operation after clicking the print job icon in step 1001, and it is determined at this point in time that the user is going to transfer the print job for the first time. This process will be discussed later with reference to FIG. 11.

It is thus determined that the user has performed a drag operation because the user mouse operation information detected by the mouse operation information acquisition unit 901 is transferred to the mouse event processor 904 as one of a drag event or a drag-over event through the OS 902. The drag event means that the user has performed a drag operation, and the drag-over event means that the cursor being dragged is placed on one item of the printer icon list. As in the drag start event, the OS 902 provides a mechanism for determining the printer icon that the mouse cursor is placed over in the drag-over event. But the determination of the print device that the printer icon corresponds to is performed by the print manager 900.

It is determined in step 1005 whether the user has stopped pressing the mouse button to release the selection of the print job (in a drop operation). It is determined in step 1005 that the user has stopped pressing the mouse button (yes in step 1005) if the mouse event processor 904 receives, through the OS 902, the user mouse operation information detected by the mouse operation information acquisition unit 901 as the drop event. It is also determined in step 1005 that the user has stopped pressing the mouse button (yes in step 1005) if the mouse event processor 904 receives a button event and detects a stop of button pressing. If it is determined in step 1005 that the user has stopped pressing the mouse button (yes in step 1005), processing proceeds to step 1006.

It is determined in step 1006 whether the mouse cursor is placed on one of the printer icons in the printer list. Step S1006 further includes the following process as long as the drag-over event is input. The drag-over event is transferred to the printer list display controller 905 through the mouse event processor 904. From coordinate information contained in the event, the printer list display controller 905 determines the printer having the icon with the drag-over event placed thereon. The result of this determination is transferred to the drag and drop controller 907.

If it is determined in step 1006 that the mouse cursor is placed on one of the printer icons in the printer list, it is considered that the user has issued a command to transfer the selected print job to a print queue represented by the printer icon. The transfer process of the print job is thus performed. It is then determined in step 1009 whether the dragged print job is transferable to the print queue represented by the printer icon. To this end, the printer list display controller 905 determines whether the printer icon having the mouse cursor placed thereon is grayed out in step 1004, by referencing an internal management table holding the display state of the printer icons. If the printer icon is not grayed out, the printer list display controller 905 issues, in step 1010, to the drag and drop controller 907, a command to transfer (re-register) the print job to the queue of the printer that is able to print out the corresponding data. After the drag and drop controller 907 instructs the job control print service 622 to transfer the print job, processing proceeds to step 1007.

If the transfer to the queue of the pointed printer is not possible, in other words, the corresponding printer icon is grayed out, processing proceeds to step 1007 without any process performed.

The internal process for the transfer of the print job in step 1010 is described next. If the print job to be transferred has the form of a print job that is issued from the application program 601 to a printer having the PDL driver 602A, the print job is directly transferred from the proxy output port 712A to the proxy output port 712B. As previously discussed, the PDL driver 602A of a printer associated with the proxy output port 712A and the PDL driver 602B of a printer associated with the proxy output port 712B must be of the same type. On the other hand, the print job to be transferred can be converted to the intermediate file 716 as shown in FIG. 7, and then transmitted from the despooler 701 to the PDL driver 602A as a member job. In response to a transfer command, the intermediate file 716 is again transmitted to the PDL driver 602B through the despooler 701.

The job control print service 622 receives, from the job control port monitor 621, data of the print job generated using the PDL driver 602, and continuously holds the data of the print job until the print device 105 confirms a print output (completion of discharging of sheets) of the print job. The transfer process of the print job can be performed while the print job is continuously held. Even after the data of the print job is transmitted to the print device 105, a job transfer can be performed based on the data of the print job, held in the job control print service 622, in response to a transfer command issued at any time by the user. The transfer command issued on the user interface of FIGS. 16-18 and 19-24 is performed while the print job is continuously held.

The data of print job held in the job control print service 622 and used during the transfer process is processed by a software raster image processor (RIP) of the job control print service 622. Subsequent to the software RIP, the data is converted into data free from device dependency. When the data of the print job is transferred, an icon is displayed as transferable across different types of printers as in the intermediate file.

In step 1007, the mouse cursor, the printer icon, and the print job icon are displayed normally. The display process is performed when the mouse cursor display controller 903, the printer list display controller 905, and the print job list display controller 906, each receiving the user operation information from the mouse event processor 904, responds to a command from the drag and drop controller 907. Processing then ends.

If it is determined in step 1006 that the mouse cursor is not placed on one of the printer icons in the printer list (no in step 1006), processing proceeds to step 1008. In step 1008, the mouse cursor and the printer icon are displayed normally. The process in step 1008 is performed when the user stops dragging the icon without placing the icon of the print job on the printer icon. As a result, no transfer process of the print job is performed, and the print job remains selected (in reverse video). This process is performed when the mouse cursor display controller 903 and the printer list display controller 905, each receiving the user operation information from the mouse event processor 904, respond to a command from the drag and drop controller 907.

If it is determined that the user has not performed a drag operation (no in step 1002), in other words, no drag operation is performed even with the print job icon selected by the user, processing proceeds to step 1011. In step 1011, it is determined whether the user has released selection the print job (performed a drop operation). If no drop operation has been performed (no in step 1011), processing returns to step 1002 to monitor a drag operation. Steps S1002 and S1011 are repeated to monitor a drag and a drop of the clicked print job icon. If the clicked print job icon is dropped without being dragged, processing proceeds from step 1011 to step 1008. In step 1008, the mouse cursor and the printer icon are displayed normally. Processing then ends.

If it is determined in step 1005 that the user has not stopped pressing the mouse button to release the selection of the print job (drag operation prior to a drop operation) (no in step 1005), processing moves fro step 1005 to step 1111 (FIG. 11) which is described below.

Figure 11:
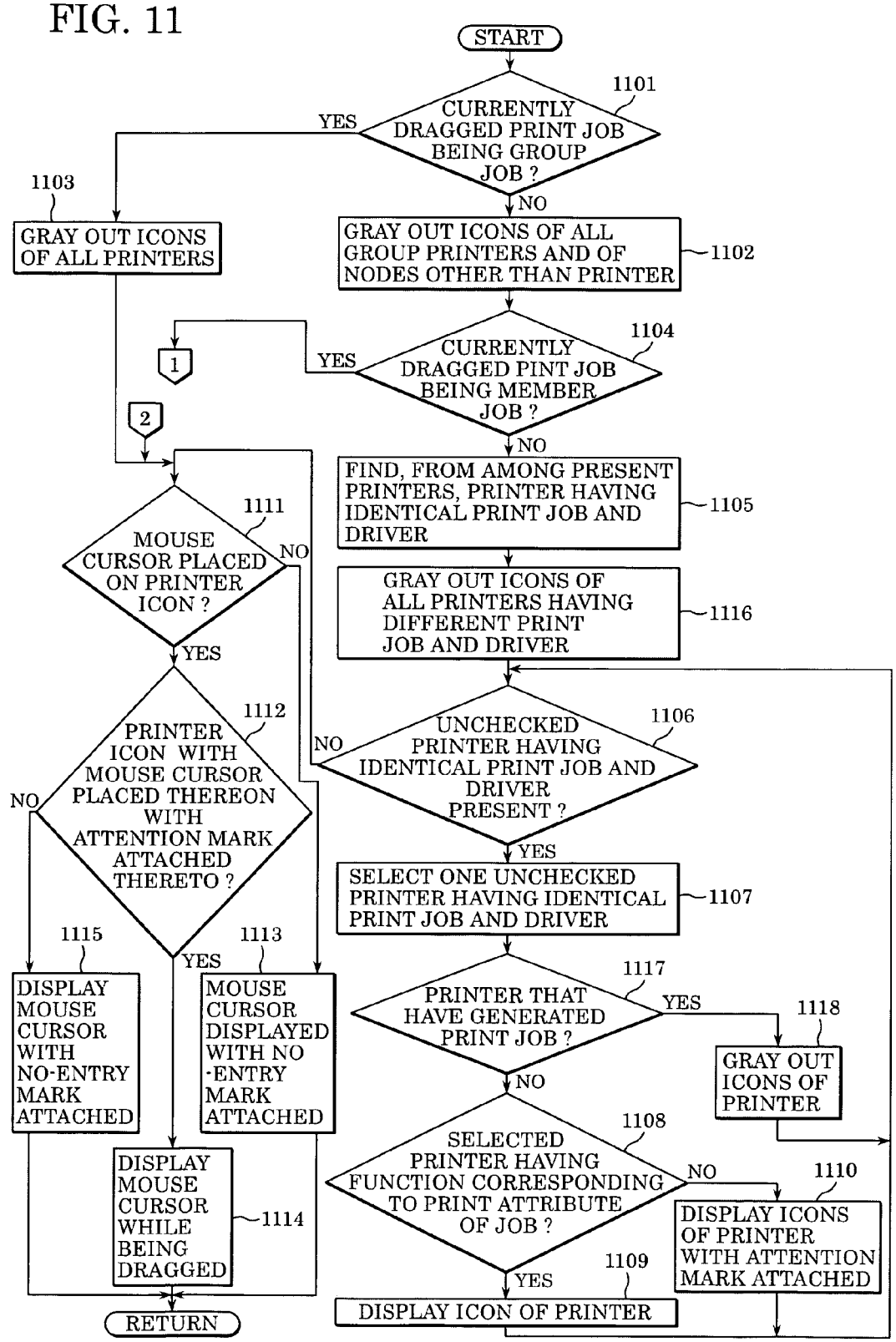
FIG. 11 is a flowchart illustrating in detail a display process of a mouse cursor and a printer icon in accordance with the first embodiment of the present invention.

FIG. 11 illustrates in detail step 1004 in the flowchart of FIG. 10. In this process, a printer presentation element of a printer unable to output a print job corresponding to a selected print job presentation element and a printer presentation element able to output the print job are displayed in a recognizable manner based on the attribute of the print job corresponding to the predetermined print job presentation element selected in response to a command input by the user at any timing, and the attribute of a printer related to the printer presentation element.

It is determined in step 1101 whether the selected print job is a group job. The group job is a virtual job that is output as an intermediate file described with reference to FIG. 6. Referencing the information acquired in step 1002, the drag and drop controller 907 performs this determination in response to a command from the printer list display controller 905.

If it is determined that the selected print job is a group job (yes in step 1101), processing moves to step 1102. In step 1103, the icons of all printers are grayed out. Processing then proceeds to step 1111 which is described later.

If it is determined that the selected print job is not a group job (no in step 1101), processing moves to step 1102. In step 1102, all icons of the group printers in the printer list are grayed out. The printer list display controller 905 performs the process in step 1102, based on the attribute information (such as a printer driver name) of each print device that is acquired from the job control print service 622 through the printer information acquisition unit 908. The icons are grayed out because a job as a group job cannot be printed in the job control apparatus. Also in step 1102, all icons other than the printer icon (for example, a node grouping printer icon) displayed in the printer list are grayed out.

It is determined in step 1104 whether the print job being dragged is a member job derived from the group job. As in step 1101, this determination is performed by the drag and drop controller 907 in response to a command from the printer list display controller 905.

The job being dragged being determined as not being a member job derived from the group job (no in step 1104) corresponds to a designated job that is generated when the application program 601 issues a print command to the PDL driver 602. In this case, the group printer driver 603 does not generate an intermediate file.

The process to be performed if it is determined in step 1104 that the print job being dragged is a member job (yes in step 1104) will be described later with reference to FIG. 12.

If it is determined that the print job being dragged is not a member job (no in step 1104), the attribute of the logical printer managed by the job control print service 622 is acquired, and printers corresponding to a printer driver identical to or interchangeable with a printer driver that has generated the print job are listed up in step 1105. In step 1116, all printer icons representing printers other than those listed here are grayed out. The printer list display controller 905 performs this gray-out operation based on driver information (such as driver name) of the print job being dragged acquired from the drag and drop controller 907, and information relating to each print device acquired from the job control print service 622 through the printer information acquisition unit 908.

The printer list display controller 905 determines in step 1106 whether any unchecked printer is present that corresponds to a printer driver compatible with the printer driver having generated the selected print job. By checking the printer corresponding to the printer driver having compatibility is meant that the presence or absence of a printer of the same language or the same data format is checked. Step S1106 is a start of a loop of each of the printers listed in step 1105. If at least one output printer is listed up in step 1105, it is determined in step 1106 that at least one unchecked printer is present, i.e., the determination is yes in step 1106. This determination is performed by the printer list display controller 905. On the other hand, if there is not at least one unchecked printer present (no in step 1106), processing proceeds to step 1111 which is described later.

In step 1107, the printer list display controller 905 selects one of the unprocessed printers from among those listed up in step 1105, and acquires the attributes of the selected printer.

In step 1117, the printer list display controller 905 determines whether the printer selected in step 1107 is the one that has processed the print job being dragged. The printer list display controller 905 performs this determination by comparing an IP (Internet protocol) address associated with the target logical printer with the item (G) of IP address associated with the destination printer (item (D) of the management information in Table I) in the information of the print job acquired in step 1003. As long as the logical printers correspond to the same device, if different from each other, the printer is determined as being the printer that has processed the print job being dragged. The IP is used to identify the logical printer of a predetermined print device to which the job is to be supplied. The present invention is not limited to the use of the IP address. For example, any information identifying the printer device, such as a printer device name associated with the logical printer may be used.

If it is determined that the printer selected in step 1107 is the one that has processed the print job being dragged (yes in step 1117), processing proceeds to step 1118. To control a useless process, such as the transfer of the selected print job to a source printer, the printer list display controller 905 grays the printer icon in step 1118. Processing then returns to step 1106. If it is determined that the printer selected in step 1107 is not the one that has processed the print job being dragged (no in step 1117), processing proceeds to step 1108.

Figure 15:
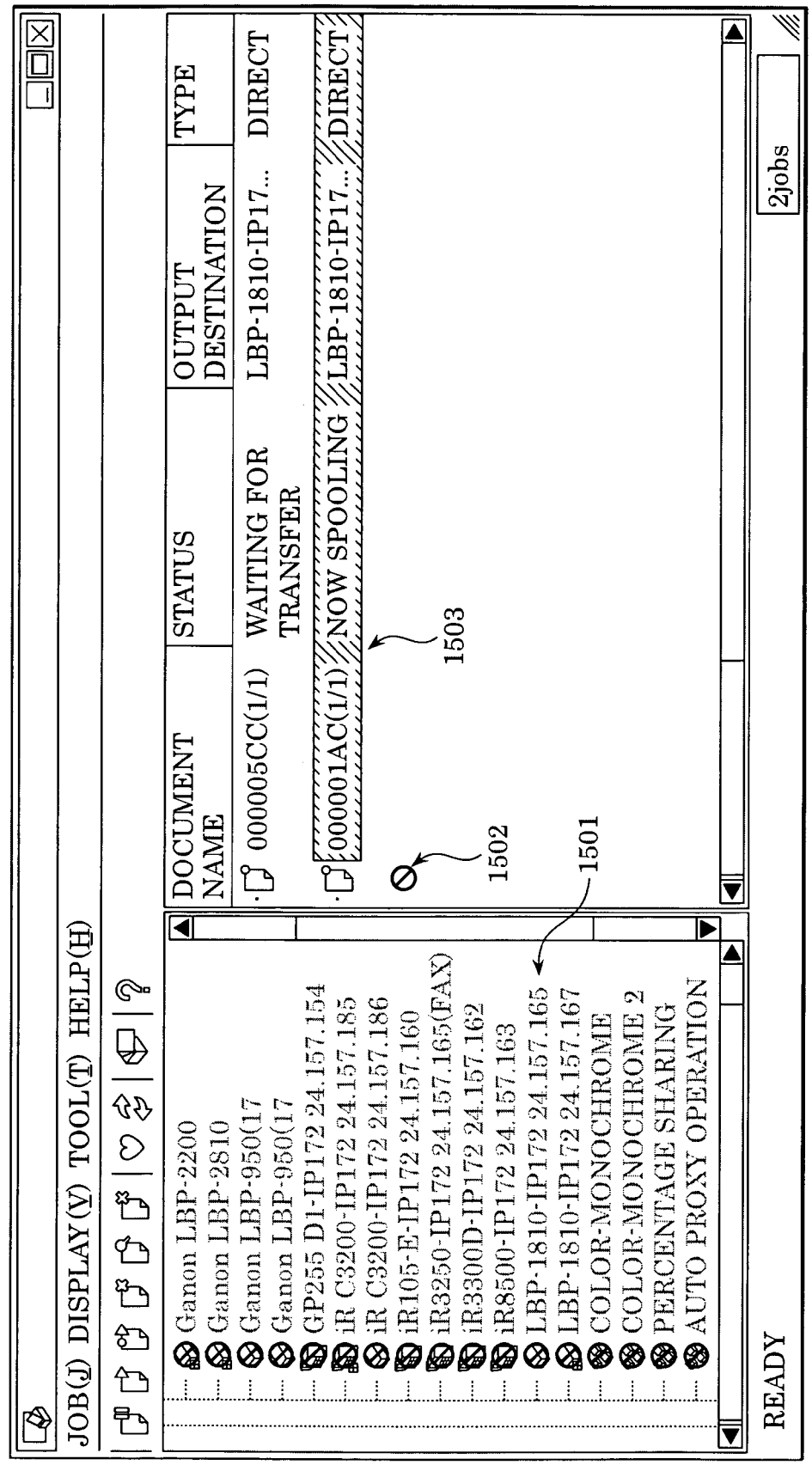
FIG. 15 illustrates a display of a mouse cursor with a no-entry mark attached thereto and a presentation of grayed-out printer icons in accordance with the first embodiment of the present invention.

FIG. 15 illustrates one example of a screen in which the printer icons are grayed out in the process in step 1118. A print job 1503 being dragged is a job the application directly inputs to a printer called "LBP-1810-IP172.24.157.167." There is no other printer that is assigned the same driver. No printers to which the job is transferable are present, and all printer icons are grayed out.

In step 1108, the printer list display controller 905 causes the drag and drop controller 907 to determine whether the function of the printer selected in step 1107 satisfies the print attribute of the print job being dragged. The drag and drop controller 907 receives the print attribute of the print job being dragged from the print job list display controller 906 to perform that determination in step 1108. The attributes, including the function, of the printer selected in step 1107 can be acquired from the logical printer managed by the job control print service 622 in step 1108, or can be acquired from the logical printer in step 1116.

If it is determined that the function of the printer selected in step 1107 satisfies all print attributes of the print job being dragged (yes in step 1108), processing moves to step 1109. In step 1109, the drag and drop controller 907 instructs the printer list display controller 905 to display the printer icon normally.

On the other hand, if it is determined that the function of the print device associated with the printer selected in step 1107 does not satisfy all print attributes of the print job being dragged (no in step 1108), processing moves to step 1110. In step 1110, the drag and drop controller 907 instructs the printer list display controller 905 to display the printer icon with an attention mark attached thereto.

FIG. 16 illustrates one example of a screen in which the printer icon with an attention mark attached thereto is displayed in the process in step 1110. A print job 1603 being dragged is a both side print job that the application directly inputs to a printer "LBP-1810-IP172.24.157.163". With the print job 1603 placed on an icon 1601 representing a printer "LBP-1810-IP172.24.157.167", that printer, having a both-side printing capability, satisfies the requirement of the print job 1603, and the printer icon 1601 is displayed normally. On the other hand, the print job 1603 cannot be transferred to the print queue of the source printer "LBP-1810-IP172.24.157.163", (because the print job 1603 is returned back to the source printer), and the icon is grayed out. The printer icon 1602 of a printer "LBP-1810-IP172.24.157.162" is assigned the same driver of the destination printer of the job, and the transfer of the print thereto is possible. However, since that printer does not have both-side printing capability, an attention mark (a solid black circle) is attached to the printer icon. The remaining printer icons, having different drivers or being group printers, are grayed out. The printer icons shown in the left-hand portion of FIG. 16 are logical printers or physical printers.

It is determined in step 1111 whether the mouse cursor is placed on one of the icons in the printer list. This determination is performed as to whether the drag-over event indicating that a drag operation of the mouse causes the mouse cursor to be placed on the icon is transferred to the mouse event processor 904 through the mouse operation information acquisition unit 901 and the OS 902.

If it is determined that the mouse cursor is not placed on one of the icons in the printer list (no in step 1111), the mouse cursor display controller 903 displays a mouse cursor with a no-entry mark attached thereto in response to information from the drag and drop controller 907 in step 1113. FIG. 15 shows a mouse cursor 1502 with a no-entry mark attached thereto displayed in step 1113.

On the other hand, if it is determined that the mouse cursor is placed on one of the icons in the printer list (yes in step 1111), processing proceeds to step 1112 where it is determined whether the printer icon is displayed with an attention mark attached thereto. If it is determined that the printer icon is displayed with an attention mark attached thereto (yes in step 1112), the mouse cursor is displayed normally (step 1114). If it is determined that the printer icon is not displayed with an attention mark attached thereto (no in step 1112), the mouse cursor is displayed with a no-entry mark attached thereto (step 1115). The user is then notified that the acquired attribute of the printer does not satisfy part of the attributes of the print job corresponding to the selected print job presentation element. For example, a message shown in a column 1302 of FIG. 13B can be displayed. The mouse cursor display controller 903 performs this display process based on the information from the drag and drop controller 907. A mouse cursor 1602 of FIG. 16 is the one that is displayed normally in step 1114. The mouse cursor with a no-entry mark attached thereto displayed in steps 1113 and 1115 looks like a cursor 1502 of FIG. 15.

A change in the printer icon and the mouse cursor is additionally displayed in a status bar presented on a lower portion of the print manager 900. More specifically, messages of FIG. 13B are displayed in each of steps 1113, 1114, and 1115 in the status bar presented on the lower portion of the print manager 900 when predetermined conditions listed in FIG. 13B are satisfied. In each of steps 1115 and 1114, a tool chip message of FIG. 13B is displayed close to the cursor.

Figure 12:
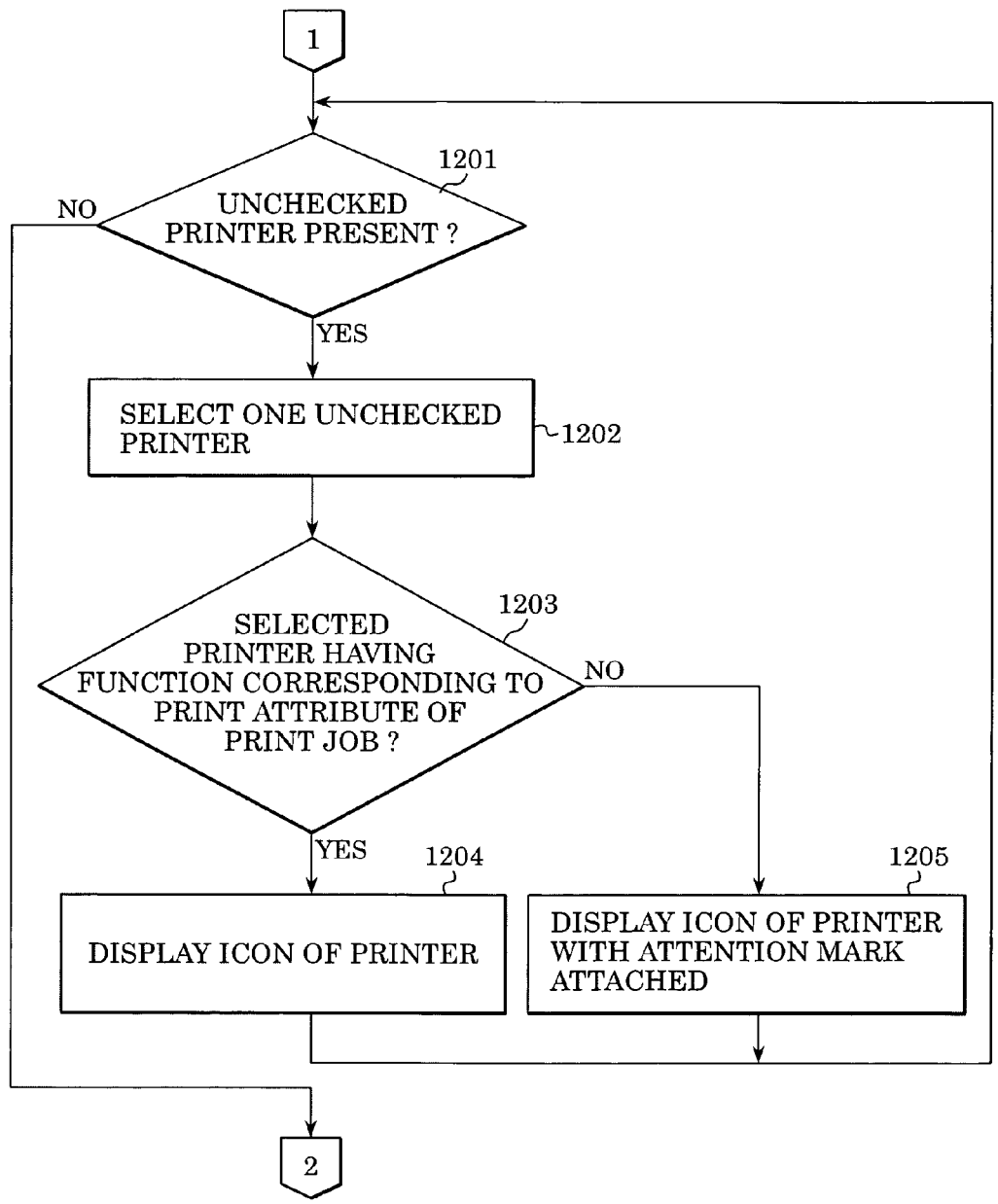
FIG. 12 is a flowchart illustrating a display process of a mouse cursor and a printer icon in accordance with the first embodiment of the present invention.

FIG. 12 illustrates a process that is performed if it is determined in step 1104 that the print job being dragged is a member job. This process is performed for each of the physical printers other than the group printer. It is determined in step 1201 whether a printer to be processed still remains. Here, the printer to be processed refers to a printer that is assigned a job control port monitor 621 unique to the print job control system.

If it is determined in step 1201 that there are not any printers to be processed still remaining, (no in step 1201), processing proceeds to step 1111 of FIG. 11 described above.

On the other hand, if it is determined in step 1201, that there is at least one printer that needs to be processed (yes in step 1201), processing moves to step 1202. In step 1202, the print job list display controller 906 selects any one from among unprocessed printers that are present.

In step 1203, the print job list display controller 906 causes the drag and drop controller 907 to examine whether the function of the printer selected in step 1201 satisfies all print attributes relating to the print job being dragged. If so, (yes in step 1203), the printer icon is displayed normally in step

1204. Processing then returns to step 1201. If not (no in step 1203), the printer icon is displayed with an attention mark attached thereto (step 1205). Processing then returns to step 1201. The acquisition method of acquiring the attributes of the logical printer is identical to the method already discussed with reference to step 1108.

A command to transfer the print job through the user interface to the same printer is prevented by performing the process of steps 1117 and 1118 between step 1202 and step 1203, although that process is not shown.

When the user selects and drags the icon of the print job displayed in the print job list using the mouse, the user interface is displayed as summarized below.

If the printer icon corresponds to the driver of the same type as the driver that has produced the dragged print job and has the function of the print attribute of the print job (for example, sheet size, the presence or absence of both-side printing unit, the presence or absence of a staple stacker), the printer icon is displayed normally.

If the printer icon corresponds to the driver of the same type as the driver that has produced the dragged print job, and has a part of the function of the print attribute of the print job, the printer icon is displayed with the attention mark attached thereto.

If the printer icon corresponds to the driver different in type from the driver that has produced the dragged print job, or corresponds to a group printer driver, the printer icon is displayed with a no-entry mark attached thereto.

The icon of the mouse cursor with the print job icon dragged is displayed with a no-entry mark attached thereto in a place other than the icon is placed on an icon of a printer in the printer list on which the print job is transferable. If the user drags the mouse and places the mouse cursor on the icon of the printer to which the print job is transferable, the mouse cursor is displayed normally.

The printer icon in the printer list is immediately modified as described above when the user selects (clicks) the icon of the print job and starts a drag operation.

In accordance with the first embodiment, the user transfers the print job easily between the print queues while determining whether or not the print job is transferable.

When the user wishes to change the destination of a print job, the user simply selects the print job. The user is thus freed from inputting the conditions of the printer as a destination of the print job, and the user is provided with a visual indication of the printer appropriate for the selected print job.

Output destination printers are appropriately limited, depending on whether the print data is produced based on the intermediate file, even if the languages of the print data are identical. The selected printers are visibly displayed so that the user enjoys a wide option of printers.

The acquisition of the attribute of the print job is triggered by the detection of the drag operation of the print job icon in accordance with the first embodiment. The present invention is not limited to this arrangement. The acquisition of the attribute of the print job contained in a window can be triggered by opening the window containing the print job icon. The same is true of the printers. The acquisition of the attribute of the printer can be triggered by opening a window containing the printer icon.

Second Embodiment

A print processing system in accordance with a second embodiment of the present invention is described next with reference to FIGS. 17 through 24. In the first embodiment, the display of the printer icon is changed at the timing of the start of the drag operation of the print job icon. In the second embodiment of the present invention, the display of the mouse cursor and the printer icon changes under predetermined conditions when the mouse cursor is placed on the printer icon in the printer list after the print job icon is selected and dragged. The rest of the construction and operation of the second embodiment remain unchanged from the first embodiment, and the discussion thereof is omitted here.

The transfer process of the print job is described in detail with reference to FIG. 17. FIG. 17 is a flowchart of a process in which a command to transfer a selected print job is issued.

When the user selects one print job from a print lob list in a point and click operation, an icon of the print job is highlighted in response in step 1701. The specific operation in step 1701 is identical to the process in step 1001 of FIG. 10.

It is determined in step 1702 whether a command to transfer (i.e., starting drag the selected print job) is issued. In other words, it is determined whether the user has performed a drag operation. The specific operation in step 1702 is identical to the operation in step 1002 of FIG. 10.

If it is determined that a command transfer is issued (yes in step 1702), processing proceeds to step 1703. In step 1703, the print job information acquisition unit 909 acquires detailed information (attributes) of the print job selected in step 1701. The specific operation in step 1703 is identical to the operation in step 1003 of FIG. 10. The information items (A) through (L) in the management information in Table I are acquired.

The display of the mouse cursor is updated in step 1704. This process will be described later with reference to FIG. 18.

If it is determined that a command transfer is not issued (no in step 1702), processing proceeds to step 1711. It is determined in step 1711 whether the user has stopped pressing the mouse button to release the selection of the print job. The determination in step 1711 is yes if the mouse event processor 904 receives, through the OS 902, the user mouse operation information detected by the mouse operation information acquisition unit 901 as the drop event. The determination in step 1711 is also yes if the button event is transferred to the mouse event processor 904 and the stop of the pressing of the mouse button is detected. If it is determined that the user has stopped pressing the mouse button (yes in step 1711), processing proceeds to step 1708. The mouse cursor is displayed in step 1708.

Processing then ends.

If the selection of the print job icon is not released (no in step 1711), processing returns to step 1702. If the user continuously presses the mouse button with no other thing performed, steps 1702 and 1711 are repeated.

After the display of the mouse cursor is updated in step 1704, processing proceeds to step 1705. It is determined in step S1705 whether the user has stopped pressing the mouse button to release the selection of the print job. The determination in step 1705 is yes if the mouse event processor 904 receives, through the OS 902, the user mouse operation detected by the mouse operation information acquisition unit 901 as a drop event. The determination in step 1705 is also yes if the button event is transferred to the mouse event processor 904 and the stop of the pressing of the mouse button is detected. If it is determined that the user has stopped pressing the mouse button (yes in step 1705), processing proceeds to step 1706. On the other hand, if the selection of the print job is not released (no in step 1705), processing returns to step 1704 to repeat updating of the display of the mouse cursor.

It is determined in step 1706 whether the mouse cursor is placed on one of the printer icons in the printer list. A drag-over event representing that the cursor being dragged is placed on the icon is transferred to the printer list display controller 905 through the mouse event processor 904. The printer list display controller 905 determines the printer with the icon having the cursor placed thereon based on coordinate information contained in the event. The result of this determination is then transferred to the drag and drop controller 907.

If it is determined in step 1706 that the mouse cursor is placed on one of the printer icons in the printer list (yes in step 1706), processing proceeds to step 1707. It is then determined in step 1707 whether the dragged print job is transferable to the print queue represented by the printer icon. To this end, the printer list display controller 905 determines whether the mouse cursor being dragged is displayed normally. The result of this determination is transferred to the drag and drop controller 907.

If is determined in step 1707 that the dragged print job is not transferable to the print queue represented by the printer icon (no in step 1707), processing proceeds to step 1710. On the other hand, if it is determined in step 1707 that the dragged print job is transferable to the print queue represented by the printer icon (yes in step 1707), processing proceeds to step 1709. The transfer process of the print job is performed in step 1709. The transfer process is identical to the process in step 1010 of FIG. 10. The process then proceeds to step 1710.

In step 1710, the mouse cursor, the printer icon, and the print job icon are displayed normally when the user issues a command to transfer the selected print job to the print queue represented by the print icon. Whether the print job is really transferred depends on the attributes of the print job and the attributes of the print device, but the mouse cursor, the printer icon, and the print job icon are displayed normally on the user interface. The display process is performed when the mouse cursor display controller 903, the printer list display controller 905, and the print job list display controller 906, each receiving the user operation information from the mouse event processor 904, respond to a command from the drag and drop controller 907.

Figure 19:
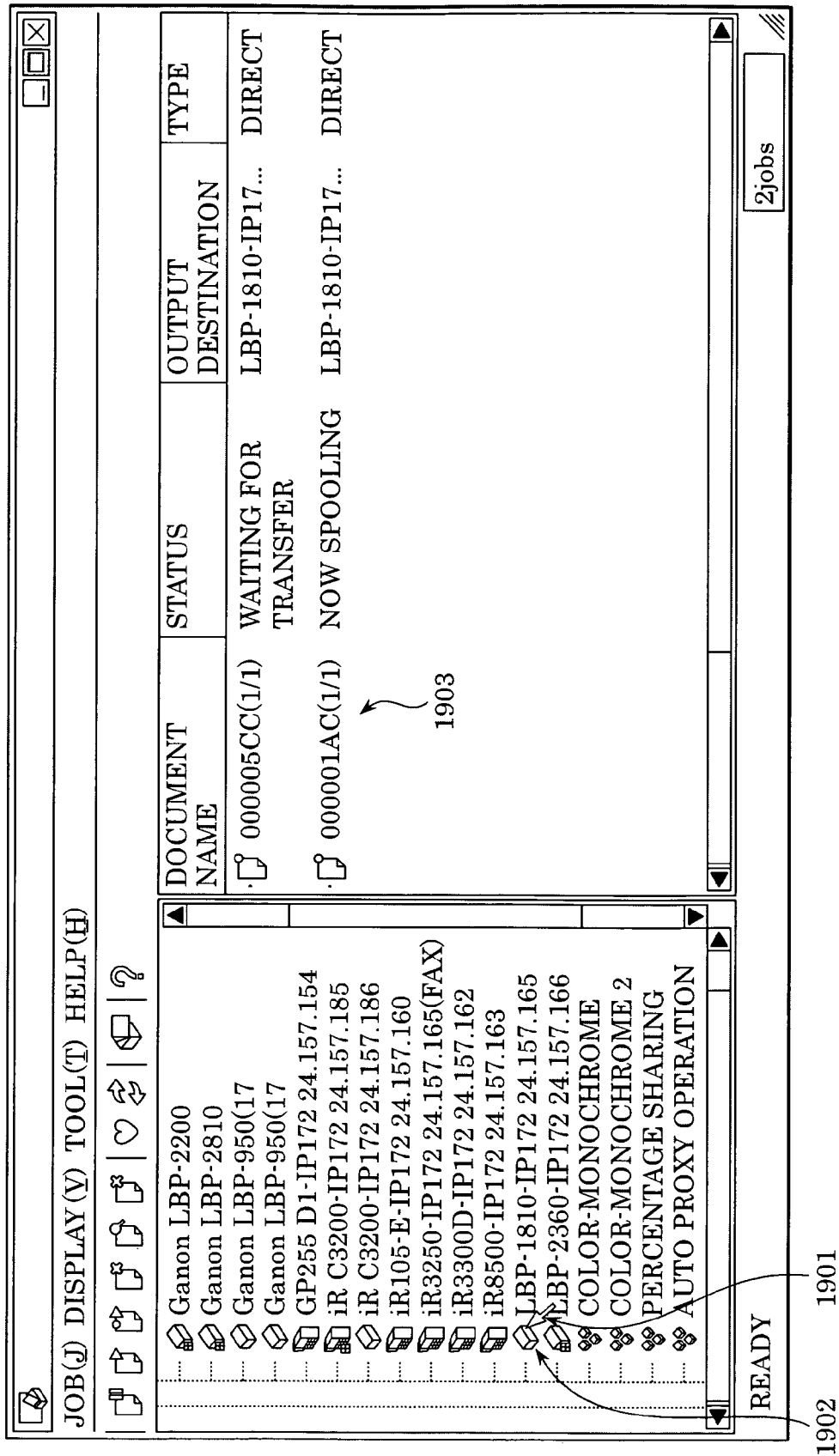
FIG. 19 illustrates a mouse cursor, and a printer icon in normal display, and a print job in a selected state in accordance with the second embodiment of the present invention.

FIG. 19 illustrates a mouse cursor 1901, a printer icon 1902, and a print job icon 1903, displayed in step 1710. When the user selects no job, the user interface looks like the screen of FIG. 19. The printer icons on the left-hand side can be logical printers or physical printers. The same is true of FIGS. 20-24.

If it is determined in step 1706 that the mouse cursor is not placed on the printer icon in the printer list, the mouse cursor and the printer icon are displayed normally in step 1708. The process in step 1708 is performed when the user stops dragging the icon without placing the icon of the print job on the printer icon. As a result, no transfer process of the print job is performed, and the print job remains selected. This process is performed when the mouse cursor display controller 903 and the printer list display controller 905, receiving the user operation information from the mouse event processor 904, respond to a command from the printer list display controller 905. Processing then ends.

Figure 20:
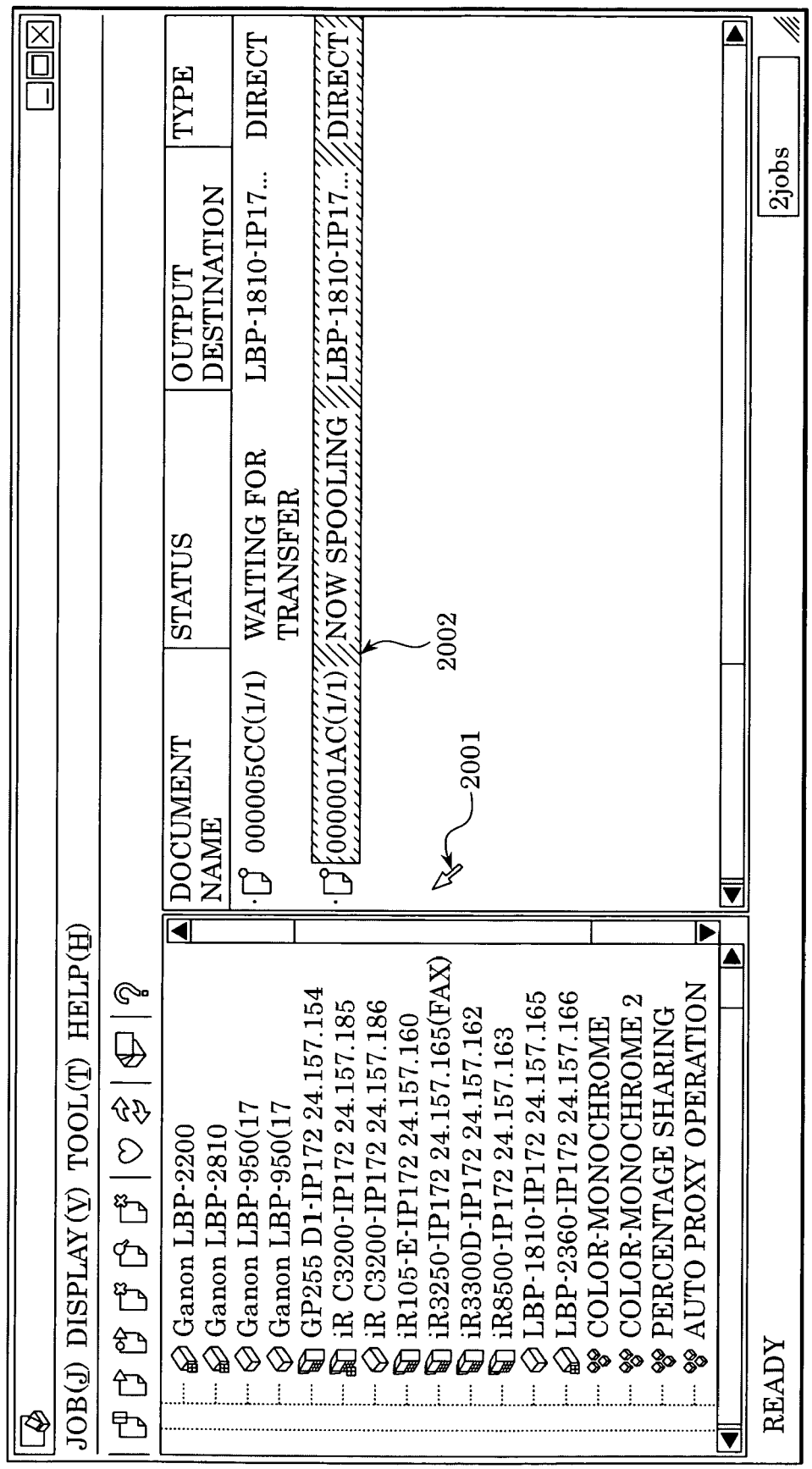
FIG. 20 illustrates a mouse cursor in normal display while being dragged and a print job in a selected state thereof.

FIG. 20 illustrates the display screen that results if it is determined in step 1706 that the mouse cursor is not placed on the printer icon in the printer list. A mouse cursor 2001 is displayed normally while a print job 2002 is in a selected state.

FIG. 18 is a flowchart illustrating in detail the process in step 1704 in the flowchart of FIG. 17. In the process, the printer presentation element of the printer unable to output the print job corresponding to the selected print job presentation element and the printer presentation element of the printer able to output the print job are displayed in a recognizable manner based on the attributes of the print job corresponding to the predetermined print job presentation element selected by a command input by a user at any timing and the attribute of the printer associated with the printer presentation element. The process is performed while the print job icon is being dragged.

In step 1801, the printer list display controller 905 determines whether the mouse cursor is placed on the printer icon in the printer list. In this process, the information of the drag operation of the mouse is transferred to the mouse cursor display controller 903 via the mouse operation information acquisition unit 901, the OS 902, and the mouse event processor 904. The mouse cursor display controller 903 issues an enquiry concerning the display method of the mouse cursor to the drag and drop controller 907. The drag and drop controller 907 instructs the printer list display controller 905 to examine the mouse cursor. The printer list display controller 905 thus performs the process in step 1801. The printer list display controller 905 acquires information of the print device with the printer icon having the mouse cursor placed thereon. The printer list display controller 905 acquires the information from the attribute information of the print device acquired from the job control print service 622 through the printer information acquisition unit 908.

Figure 21:
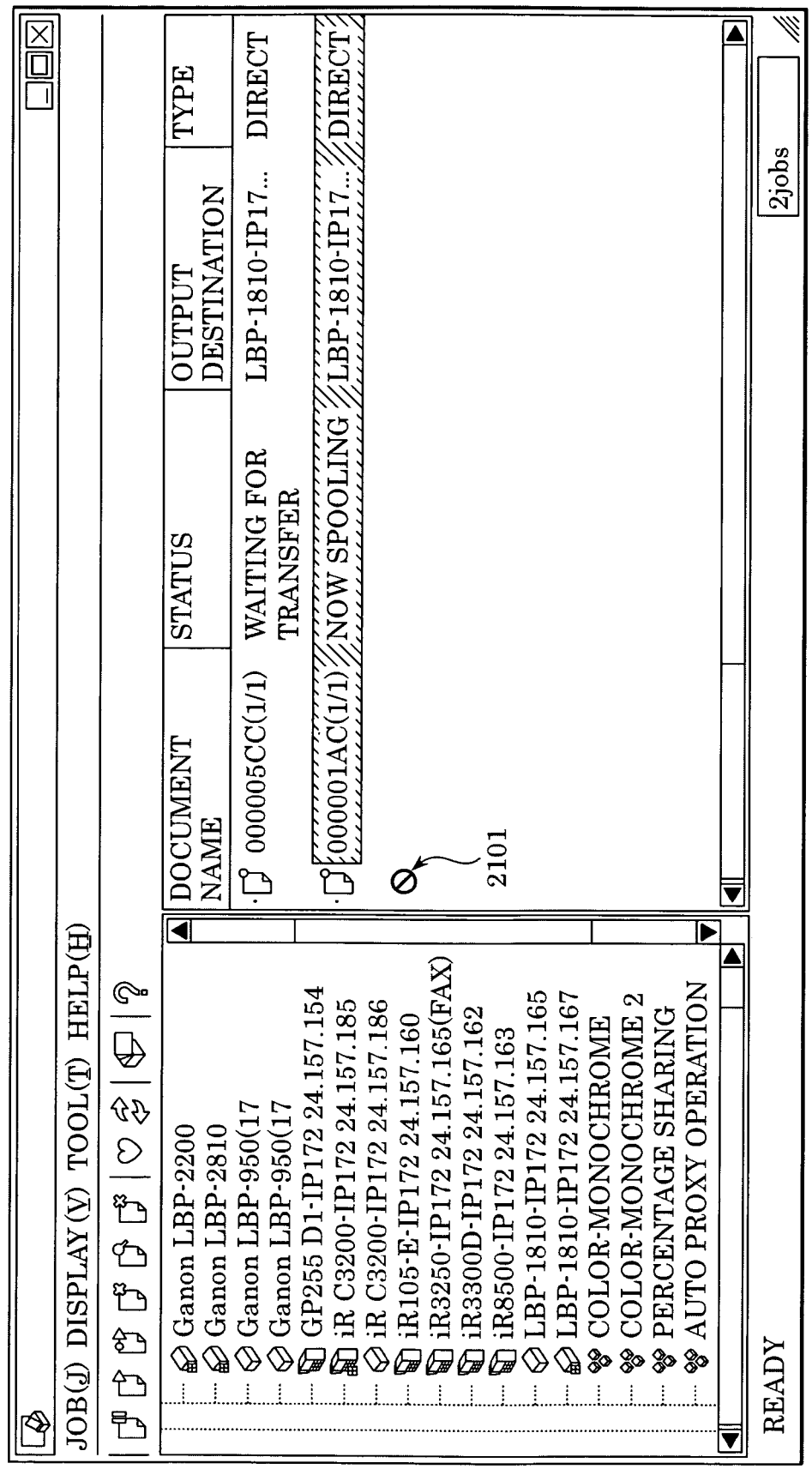
FIG. 21 illustrates a mouse cursor with a no-entry mark attached thereto in accordance with the second embodiment of the present invention.

If it is determined that the mouse is not placed on the printer icon (no in step 1801), processing proceeds to step 1810 where the mouse cursor is updated in position and then displayed with the no-entry mark attached thereto. Processing the ends. On the other hand, if it is determined that the mouse is placed on the printer icon (yes in step 1801), the printer list display controller 905 acquires the attribute of the logical printer corresponding to the printer icon having the cursor placed thereon. Processing proceeds to step 1802. FIG. 21 illustrates a mouse cursor 2101 with the no-entry mark attached thereto. The attributes acquired include information required for determinations in steps 1803, 1806, and 1807. Alternatively, the attributes of the logical printer can be acquired at each of steps 1803, 1806, and 1807.

In step 1802, the drag and drop controller 907 determines whether the selected print job is a group job, based on the acquired information in response to a command from the mouse cursor display controller 903. If it is determined that the selected print job is a group job (yes in step 1802), processing proceeds to step 1805. If it is determined that the selected print job is not a group job (no in step 1802), processing proceeds to step 1803.

It is determined in step 1803 whether the print job being dragged is a print job processed by the printer having the mouse cursor placed thereon. The determination method is identical to the determination method in step 1117. If it is determined that the print job being dragged is a print job processed by the printer having the mouse cursor placed thereon (yes in step 1803), processing proceeds to step 1805. If it is determined that the print job being dragged is not a print job processed by the printer having the mouse cursor placed thereon (no in step 1803), processing proceeds to step 1804.

In step 1804, the drag and drop controller 907 determines whether the selected print job is a member job derived from the group job. In response to a command from the mouse cursor display controller 903, the drag and drop controller 907 performs this determination based on the information acquired in step 1702.

If it is determined that the selected print job is a member job derived from the group job (yes in step 1804), processing proceeds to step 1807. If it is determined that the selected print job is not a member job derived from the group job (no in step 1804), processing proceeds to step 1806. In response to a command from the mouse cursor display controller 903, the drag and drop controller 907 performs this determination based on the information acquired in step 1702.

The drag and drop controller 907 determines in step 1806 whether the driver assigned to the printer having the mouse cursor placed thereon is of the same type as the driver that has produced the print job. The mouse cursor display controller 903 issues a determination command to the drag and drop controller 907. In response to the determination command from the mouse cursor display controller 903, the drag and drop controller 907 performs this determination, acquiring driver information of the dragged print job and driver information assigned to the printer from the print job list display controller 906 and the printer list display controller 905, respectively.

If it is determined in step 1806 that the drivers are of the same type (yes in step 1806), processing proceeds to step 1807. If not (no in step 1806), processing proceeds to step 1805.

In step 1805, the mouse cursor display controller 903 displays the mouse cursor with the no-entry mark attached thereto based on information acquired from the drag and drop controller 907.

Figure 22:
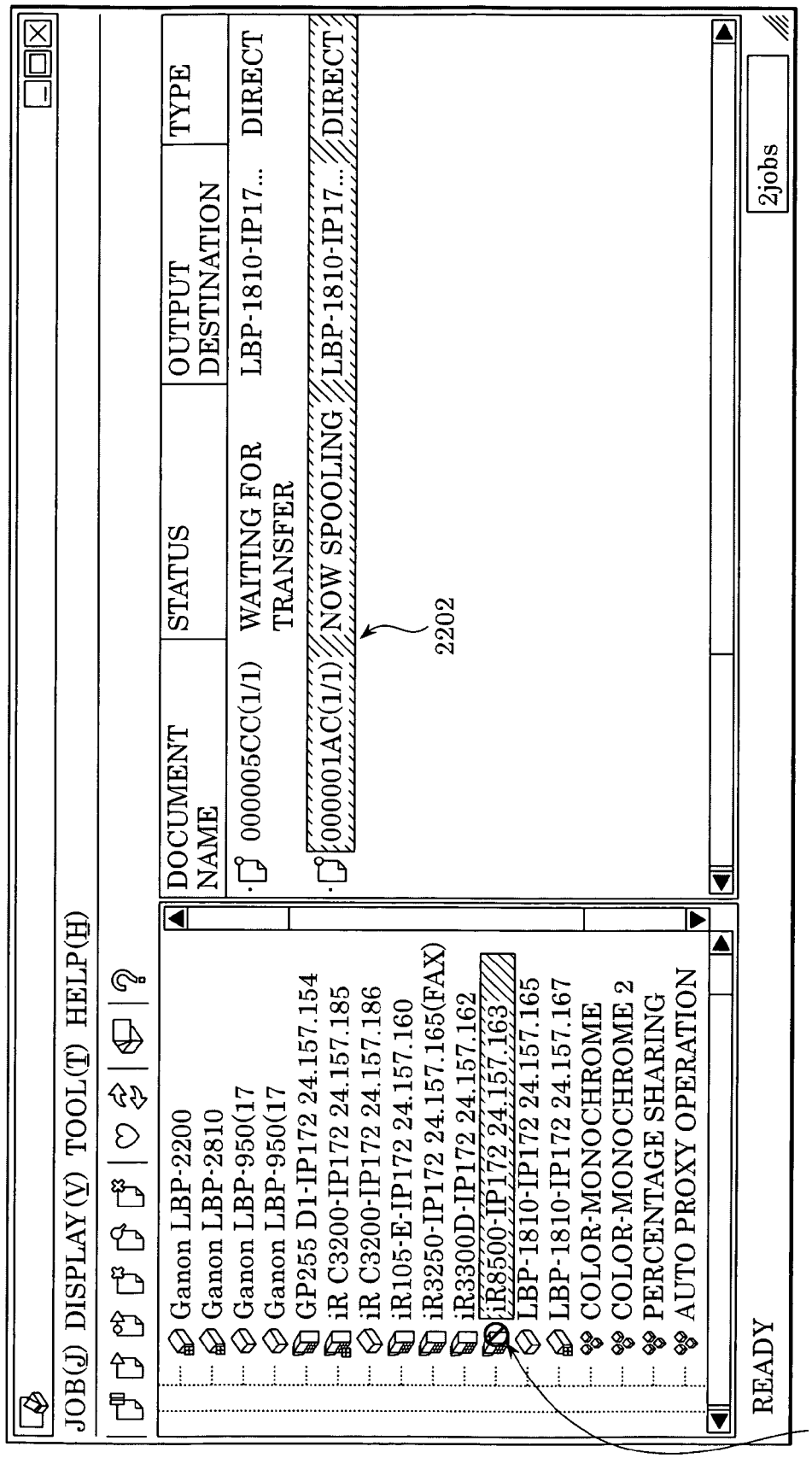
FIG. 22 illustrates a mouse cursor with an attention mark attached thereto in accordance with the second embodiment of the present invention.

FIG. 22 illustrates a mouse cursor with a no-entry mark attached thereto. As shown in FIG. 22, the print job dragged by the user is a direct print job with the mouse cursor having the no-entry mark attached thereto.

In step 1807, the mouse cursor display controller 903 causes the drag and drop controller 907 to examine whether the function of the print device corresponding to the printer icon having the mouse cursor placed thereon fully satisfies the print attributes of the print job being dragged. The drag and drop controller 907 receives the print attributes of the print job from the print job list display controller 906 for this determination. If it is determined in step 1807 that the function of the print device corresponding to the printer icon having the mouse cursor placed thereon fully satisfies the print attribute of the print job being dragged (yes in step 1807), the mouse cursor display controller 903 displays the mouse cursor normally while being dragged (step 1808).

Figure 23:
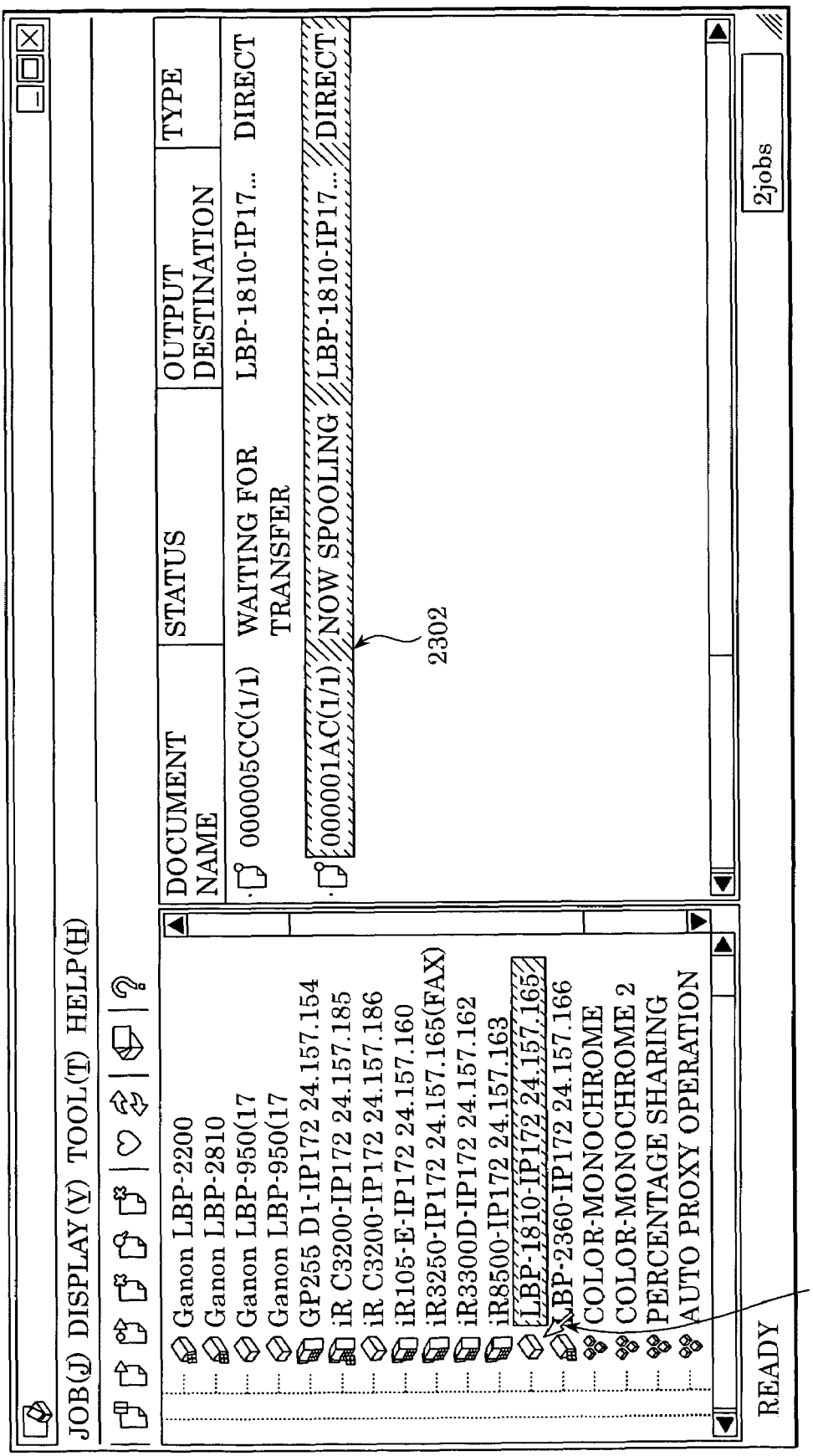
FIG. 23 illustrates a mouse cursor placed on an icon of a printer, to which the print job is transferable, in normal display in accordance with the second embodiment of the present invention.

FIG. 23 illustrates a mouse cursor 2301 normally displayed while being dragged in step 1808. As shown, the user drags and places the icon of a both-side print job 2302 (in reverse video) directly input from the application to a printer "LBP-1810-IP172.24.157.166" on the icon of a printer "LBP-1810-IP172.24.157.165". The two printers are of the same type and are assigned the same driver. Since the latter printer has both-side printing capability and has the function of performing a print job, the mouse cursor 2301 is displayed while being dragged.

If it is determined in step 1807 that the function of the print device corresponding to the printer icon having the mouse cursor placed thereon does not satisfy all of the print attributes of the print job being dragged, the mouse cursor display controller 903 displays the mouse cursor with an attention mark attached thereto. The mouse cursor display controller 903 notifies the user that the acquired attributes of the printer does not satisfy all of the attributes of the print job corresponding to the selected print job presentation element. The message shown in the column 1302 of FIG. 13B is displayed, for example.

Figure 24:
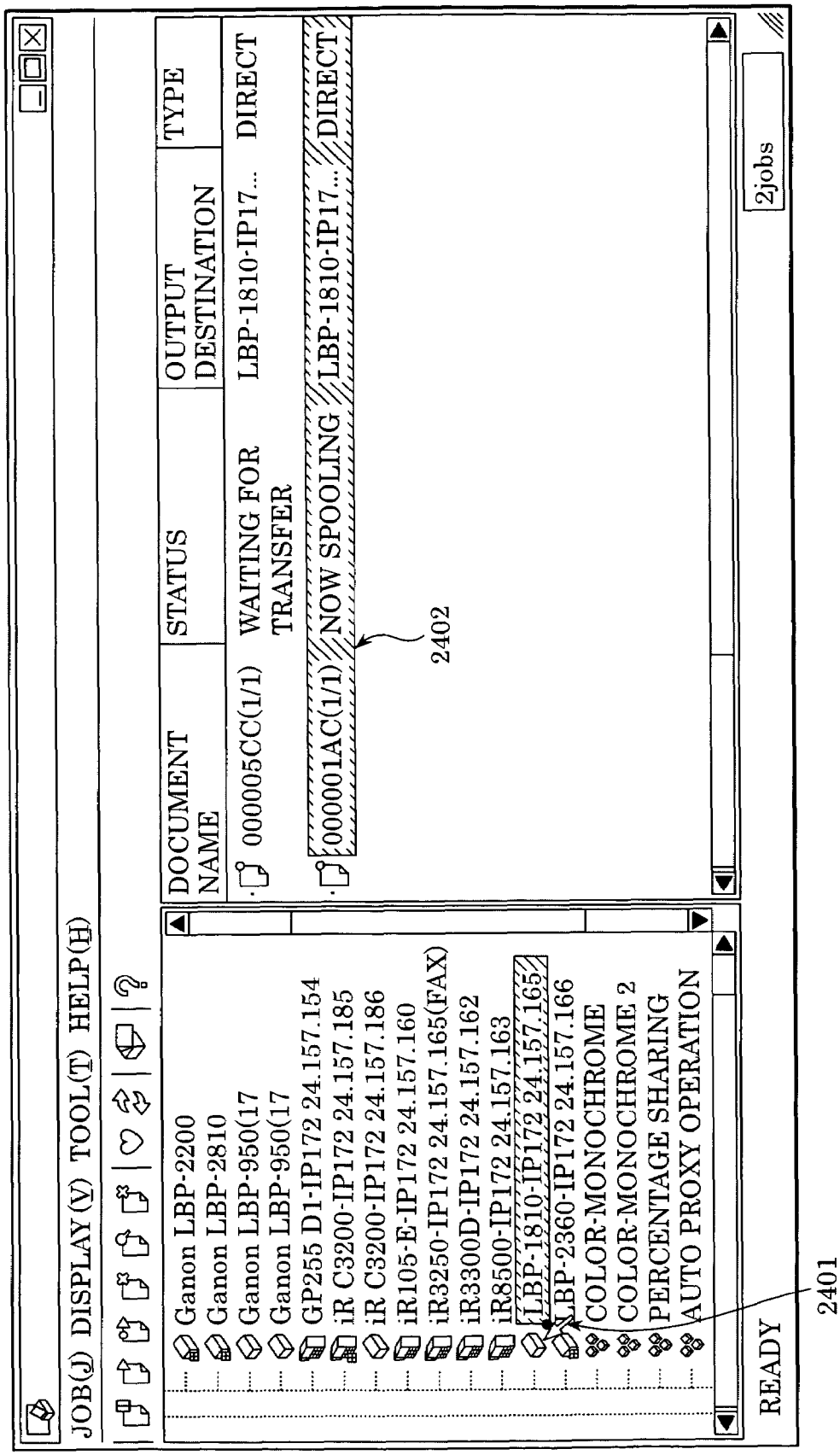
FIG. 24 illustrates a mouse cursor placed on an icon of a printer, to which the print job is transferable, with an attention mark attached thereto in accordance with the second embodiment of the present invention.

FIG. 24 illustrates a mouse cursor 2401 with an attention mark attached thereto. As shown, the user drags and places the icon of a both-side print job 2402 (in reverse video) directly input from the application to a printer "LBP-1810-IP172.24.157.166" on the icon of a printer "LBP-1810-IP172.24.157.165". Since the two printers are of the same type and are assigned the same driver, the transfer of the print job is possible. However, since the printer "LBP-1810-IP172.24.157.165" does not have both-side printing capability, a mouse cursor 2401 is displayed with an attention mark (black circle) attached thereto.

When the user selects and drags the icon of the print job displayed in the print job list using the mouse, the user interface is displayed as summarized below.

The user drags the mouse and places the mouse cursor on the icon of the printer in the printer list to which the print job is transferable. If the print device corresponding to the printer icon is able to output the print job and has the function applicable to the attribute of the print job, the mouse cursor is displayed normally.

The user drags the mouse and places the mouse cursor on the icon of the printer in the printer list. If the print job is transferable to the printer and if the printer has a part of the function of the print attribute of the print job, the mouse cursor is displayed with an attention mark attached thereto.

The user drags the mouse and places the mouse cursor on the icon of the printer in the printer list to which the print job is transferable. If the print device corresponding to the printer icon is unable to output the print job, the mouse cursor is displayed with the no-entry mark attached thereto.

The icon of the mouse cursor with the print job icon dragged is displayed with the no-entry mark attached thereto in a place other than a location where the mouse cursor is placed on the printer icon to which the print job is transferable.

In accordance with the second embodiment, the user easily learns whether the print job is transferable to the printer by simply dragging a predetermined print job selected from the list to the icons of a plurality of printers.

Since the second embodiment is free from the need to acquire a large amount of printer information that is required to determine the status of all printer icons, the second embodiment provides fast response in the updating of the display in comparison with the first embodiment. The second embodiment does not offer listing feature. In an environment where the group printer is not used and the print job is transferred between printers of the same type, the model of the source printer limits the applicable destination printers. The list presentation is not so advantageous, and the second embodiment is still appropriate in such an environment.

The display of the cursor is changed depending on the printer icon. The present invention is not limited to this arrangement. The display of the printer icon can be modified depending on the print job pointed to by the cursor.

Third Embodiment

In the first and second embodiments, a print job is transferred within a client that has produced the print job. The present invention is not limited to such an arrangement. A user, different from a user who has issued a command to transfer a print job, can transfer the print job. In other words, the command to transfer the print job can be received from another computer that communicates with the client.

More specifically, a management console 633 (a unit equivalent to the print manager 623 is also acceptable) running in a computer, different from a computer holding a print job to be transferred, transfers an API call command interpretable by the computer holding the print job, receives an API response from the computer holding the print job, and shows the received response on the user interface. In this way, the display control shown in FIGS. 14-16 and FIGS. 19-24 is carried out.

The other computer acquires, as an API response, the attributes of the print job held by the computer communicably linked via a network, performs the processes of the flowcharts of FIGS. 10-12 and FIGS. 14-17 based on the acquired attributes and the attributes of printers, and provides the displays of FIGS. 14-16 and FIGS. 19-24 on the remote computer.

The attributes of the printer can be acquired from the remote computer holding the print job to be transferred, in response to the API call command. Alternatively, the other computer can acquire key information, such as a printer name or a printer driver name, in response to the API call command, and can extract the attributes of the printer from a database held beforehand in its own apparatus based on the key information. The management console 633 transfers a predetermined print job to a predetermined printer in accordance with the processes in steps 1001-1009 of FIG. 10 and the processes in steps 1701-1706 of FIG. 17. The API to be transferred (registered) to the queue of the printer designated as a destination of the print job is transferred to the other computer. The other computer transfers the print job in the same process as in steps 1010 and 1709.

In accordance with the third embodiment, a system administrator from a remote place, for example, can transfer a print job held in a predetermined print queue (proxy output port 712) produced by another computer (such as a printer server). Furthermore, from a remote place, a print job held by each of other computers can be consistently transferred. The third embodiment of the present invention is advantageously used in printing businesses.

In each of the above-referenced embodiments, when the print job is selected on a display screen, the printer able to output the print job and the printer unable to output the print job are displayed in a recognizable manner.

Alternate Embodiments

In the first through third embodiments, the attributes of the logical printer managed by the job control print service 622 are acquired in each of steps 1105, 1117, and 1108 of FIG. 11, and steps 1801, 1803, and 1807 of FIG. 18. The present invention is not limited to this arrangement. The information processing apparatus can acquire the printer attributes from a physical printer as a destination of the print job through a communication line.

The attributes of the logical printer can be the attributes of output ports (corresponding to proxy output port 712 and output port 711) corresponding to the logical printer. More specifically, a unit corresponding to the logical printer is assigned the attributes of the logical printer, and the attributes of the logical printer are thus acquired from the unit.

The present invention is applicable to a system including a plurality of apparatuses, or a single apparatus.

The software program performing the function of the above-referenced embodiments is supplied to a system or an apparatus directly or from a remote place, and a computer of the system or the apparatus reads the program code of the software program to perform the functions of the above-referenced embodiments. As long as the functions of the program are performed, the program does not necessarily take a typical form of computer program.

Program code installed in the computer to perform the functions of the above-referenced embodiments falls within the scope of the present invention.

As long as the functions of the program are performed, the form of the program is not important. For example, the category of program includes object code, a program executed by an interpreter, or script data supplied to an operating system (OS).

Available as the recording medium 204 for supplying the program are a floppy disk, a hard disk, an optical disk, a magneto-optical disk, a CD-ROM (compact disk—read-only memory), a CD-R (compact disk—recordable), a CD-RW (compact disk—rewritable), a magnetic tape, a non-volatile memory, ROM, DVD-ROM (digital versatile disk—read-only memory), and DVD-R (digital versatile disk—recordable).

A client computer is connected to the Internet and accesses a home page using a browser of the client computer. The program of the embodiments of the present invention, or a file containing compressed program with an automatic install function may be downloaded to a recording medium, such as a hard disk. Program code constituting the program of the embodiments of the present invention are divided into a plurality of files, and the files may be downloaded from different home pages. A world wide web (WWW) server for downloading, to a plurality of users, the program files for causing the computer to perform the processes of the functions of the embodiments of the present invention also fall within the scope of the present invention.

A CD-ROM storing the computer programs of the embodiments of the present invention in an encrypted form thereof may be distributed to users. Key information for decrypting the computer program is downloaded from a home page via the Internet to a user who satisfies a predetermined condition. The user decrypts the computer program with the key information and installs the computer program onto the computer.

By executing the program code read by the computer, the functions of the embodiments are performed. Furthermore, the operation system (OS) running on the computer performs partly or entirely a process in response to the instructions of the program code, and with the process performed, the functions of the above-described embodiments are performed.

The program from the recording medium may be read into a memory incorporated in a feature expansion board in the computer or in a feature expansion unit connected to the computer. The CPU mounted on the feature expansion board or the feature expansion unit performs partly or entirely the actual process in response to the instructions from the program. The functions of the above embodiments are executed through the process.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-405028 filed Dec. 3, 2003, which is hereby incorporated by reference herein.

What is claimed is:

1. An information processing apparatus communicating with an input device and a display, the information processing apparatus comprising:
 a first acquisition unit that acquires attribute information of a print job corresponding to a print job presentation element selected by a selection indication via the input device;

a second acquisition unit that acquires attribute information of a logical printer or a physical printer corresponding to a printer presentation element;

a determination unit that determines which each of the logical printers or the physical printers to which the printer presentation element displayed on the screen corresponds has a function for outputting the print job corresponding to the selected print job presentation element, based on the attribute information of the print job acquired by the first acquisition unit and the attribute information of the logical printer or the physical printer acquired by the second acquisition unit;

a display controller that displays on a screen of the display the print job presentation element and the printer presentation element, the print job presentation element symbolically presenting a print job and the printer presentation element symbolically presenting a print queue corresponding to a logical printer or a physical printer, wherein when the print job presentation element is selected, the display controller modifies a display status of the printer presentation element of the logical printer or the physical printer which has no function for outputting the print job corresponding to the selected print job presentation element, and the printer presentation element of the logical printer or the physical printer which partially has function for outputting the print job, so as to be distinguished from the printer presentation element of the logical printer or the physical printer which has the full function for outputting the print job, based on the determination; and a transfer unit that transfers, in accordance with a drop operation of the selected print job presentation element on the printer presentation element of the printer which has the full function or partially has function for outputting the print job corresponding to the selected print job presentation element, the selected print job to a queue of the printer corresponding to the printer presentation element on which the drop operation is detected.

2. The information processing apparatus according to claim 1, wherein the display controller displays, if the print job is produced using an intermediate file, the printer presentation element of a logical printer or a physical printer corresponding to a printer driver which is able to produce a print job using the intermediate file, as the printer presentation element of the logical printer or the physical printer which is able to output the print job, and displays, if the print job is produced not using an intermediate file, the printer presentation element of a logical printer or a physical printer corresponding to a printer driver that is interchangeable with a printer driver that has produced the print job, as the printer presentation element of the logical printer or the physical printer which is able to output the print job.

3. The information processing apparatus according to claim 1, wherein the display controller displays the printer presentation element corresponding to the logical printer or the physical printer which is able to output the print job corresponding to the selected print job presentation element, so as to be distinguished from the printer presentation element of the logical printer or the physical printer which is unable to output the print job, when a transfer indication to transfer the print job presentation element is input via the input device.

4. The information processing apparatus according to claim 1, wherein the display controller registers the print job corresponding to the print job presentation element in a print queue corresponding to the printer presentation element to be transferred when the transfer indication is input via the input device to transfer the print job presentation element on the printer presentation element of the logical printer or the physical printer which is able to output the print job corresponding to the selected print job presentation element.

5. The information processing apparatus according to claim 1, wherein the print job presentation element is a print job icon representing a print job, and the printer presentation element is a printer icon representing a print queue, and wherein the display controller modifies a display status of the printer icon of the logical printer or the physical printer which is unable to output the print job corresponding to the selected print job icon when the print job icon is selected.

6. The information processing apparatus according to claim 1, wherein the print job presentation element is a print job icon representing a print job, and the printer presentation element is a printer icon representing a print queue, and wherein the display controller displays a warning if the print job icon is selected and transferred onto the printer icon corresponding to the logical printer or the physical printer which is unable to output the print job corresponding to the print job icon.

7. The information processing apparatus according to claim 1, wherein the first acquisition unit acquires the attribute information of the print job corresponding to the print job presentation element when a transfer indication of the print job presentation element is input via the input device.

8. The information processing apparatus according to claim 1, wherein the second acquisition unit acquires the attribute information of the logical printer or the physical printer indicated by the printer presentation element when a transfer indication of the print job presentation element is input via the input device.

9. The information processing apparatus according to claim 1, wherein the display controller provides a warning display indicating that the attribute information of the print job corresponding to the selected print job presentation element is partially unsatisfied based on the attribute information of the print job acquired by the first acquisition unit and the attribute information of the logical printer or the physical printer acquired by the second acquisition unit.

10. The information processing apparatus according to claim 1, wherein the attribute information of the print job acquired by the first acquisition unit and the attribute information of the logical printer or the physical printer acquired by the second acquisition unit include a printer driver name.

11. The information processing apparatus according to claim 1, wherein the display controller identifies a plurality of logical printers corresponding to the physical printer associated with the print job acquired by the first acquisition unit, based on physical printer identification information associated with each of the logical printers, and displays the printer presentation element of each of the identified logical printers as being unable to output the print job.

12. The information processing apparatus according to claim 1, wherein the display controller displays the printer presentation element corresponding to the logical printer or the physical printer which is unable to output the print job corresponding to the selected print job presentation element, so as to be distinguished from the printer presentation element of the logical printer or the physical printer which is able to output the print job, based on the attribute information of the print job stored in the other computer communicating through a network of the first acquisition unit, and the attribute information of the logical printer or the physical printer acquired by the second acquisition unit.

13. The information processing apparatus according to claim 1, wherein the transfer is a process for re-registering by modifying an association of the print job to a print queue.

14. An information processing method comprising:
a display control step for displaying on a screen of a display, a print job presentation element and a printer presentation element, the print job presentation element symbolically representing a print job and the printer presentation element symbolically representing a print queue corresponding to a logical printer or a physical printer;
a first acquisition step for acquiring attribute information of the print job corresponding to a print job presentation element selected by a selection indication via an input device;
a second acquisition step for acquiring attribute information of the logical printer or the physical printer corresponding to the printer presentation element;
a determination step for determining which each of the logical printers or the physical printers to which the printer presentation element displayed on the screen corresponds has a function for outputting the print job corresponding to the selected print job presentation element, based on the attribute information of the print job acquired by the first acquisition step and the attribute information of the logical printer or the physical printer acquired by the second acquisition step;
a display modifying step for modifying, when the print job presentation element is selected, a display status of the printer presentation element of the logical printer or the physical printer which has no function for outputting the print job corresponding to the selected print job presentation element, and the printer presentation element of the logical printer or the physical printer which partially has function for outputting the print job so as to be distinguished from the printer presentation element of the logical printer or the physical printer which has full function for outputting the print job, based on the determination; and
a transfer step for transferring, in accordance with a drop operation of the selected print job presentation element on the printer presentation element of the printer which partially has function or has full function for outputting the print job corresponding to the selected print job presentation element, the selected print job to a queue of the printer corresponding to the printer presentation element on which the drop operation is detected.

15. The information processing method according to claim 14, wherein the display control step displays on the screen, if the print job is produced using an intermediate file, the printer presentation element of a logical printer or a physical printer corresponding to a printer driver which is able to produce a print job using the intermediate tile, as the printer presentation element of the logical printer or the physical printer which is able to output the print job, and
displays on the screen, if the print job is produced not using an intermediate tile, the printer presentation element of a logical printer or a physical printer corresponding to a printer driver that is interchangeable with a printer driver that has produced the print job, as the printer presentation element of the logical printer or the physical printer which is able to output the print job.

16. The information processing method according to claim 14, wherein the display control step displays the printer presentation element corresponding to the logical printer or the physical printer which is able to output the print job corresponding to the selected print job presentation element, so as to be distinguished from the printer presentation element corresponding to the logical printer or the physical printer which is unable to output the print job, when a transfer indication to transfer the print job presentation element is input via the input device.

17. The information processing method according to claim 14, wherein the display control step resisters the print job corresponding to the print job presentation element in a print queue corresponding to the printer presentation element to be transferred when the transfer indication is input via the input device to transfer the print job presentation element on the printer presentation element of the logical printer or the physical printer which is able to output the print job corresponding to the selected print job presentation element.

18. The information processing method according to claim 14,
wherein the print job presentation element is a print job icon representing a print job, and the printer presentation element is a printer icon representing a print queue, and
wherein the display control step modifies a display status of the printer icon of the logical printer or the physical printer which is unable to output the print job corresponding to the selected print job icon when the print job icon is selected.

19. The information processing apparatus according to claim 14, wherein the print job presentation element is a print job icon representing a print job, and the printer presentation element is a printer icon representing a print queue, and
wherein the display control step displays a warning if the print job icon is selected and transferred onto the printer icon corresponding to the logical printer or the physical printer which is unable to output the print job corresponding to the print job icon.

20. The information processing method according to claim 14, wherein the first acquisition step acquires the attribute information of the print job corresponding to the print job presentation element when a transfer indication of the print job presentation element is input via the input device.

21. The information processing method according to claim 14, wherein the second acquisition step acquires the attribute information of the logical printer or the physical printer indicated by the printer presentation element when the transfer indication of the print job presentation element is input via the input device.

22. The information processing method according to claim 14, wherein the display control step provides a warning display indicating that the attribute information of the print job corresponding to the selected print job presentation element is partially unsatisfied based on the attribute information of the print job acquired by the first acquisition step and the attribute information of the logical printer or the physical printer acquired by the second acquisition step.

23. The information processing method according to claim 14, wherein the attribute information of the print job acquired by the first acquisition step and the attribute information of the logical printer or the physical printer acquired by the second acquisition step include a printer driver name.

24. The information processing method according to claim 14, wherein the display control step identifies a plurality of logical printers corresponding to the physical printer associated with the print job acquired by the first acquisition step, based on physical printer identification information associated with each of the logical printers, and displays the printer presentation element of each of the identified logical printers as being unable to output the print job.

25. The information processing method according to claim 14, wherein the display control step displays the printer presentation element corresponding to the logical printer or the physical printer which is unable to output the print job corresponding to the selected print job presentation element, so as to be distinguished from the printer presentation element of the logical printer or the physical printer which is able to output the print job, based on the attribute information of the print job stored in the other computer communicating through a network in the first acquisition step, and the attribute information of the logical printer or the physical printer.

26. The information processing method according to claim 14, wherein the transfer is a process for re-registering by modifying an association of the print job to a print queue.

* * * * *